United States Patent
MacQueen et al.

(10) Patent No.: US 6,730,388 B2
(45) Date of Patent: May 4, 2004

(54) COATING HAVING MACROSCOPIC TEXTURE AND PROCESS FOR MAKING SAME

(75) Inventors: Richard C. MacQueen, Phillipsburg, NJ (US); Loyd J. Burcham, Horsham, PA (US); Anthony A. Parker, Newtown, PA (US); Deborah A. Sciangola, Glenmore, PA (US); Donald B. Henry, Warminster, PA (US); Donald C. Ferguson, Bordentown, NJ (US)

(73) Assignee: Congoleum Corporation, Trenton, NJ (US)

( * ) Notice: Subject to any disclaimer, the term of this patent is extended or adjusted under 35 U.S.C. 154(b) by 134 days.

(21) Appl. No.: 09/765,713

(22) Filed: Jan. 19, 2001

(65) Prior Publication Data

US 2001/0038910 A1 Nov. 8, 2001

Related U.S. Application Data

(63) Continuation-in-part of application No. 09/489,420, filed on Jan. 21, 2000, now Pat. No. 6,399,670.

(51) Int. Cl.[7] .............................. B05D 5/06; B32B 3/00; B32B 5/16

(52) U.S. Cl. ..................... 428/141; 428/143; 428/144; 428/145; 428/167; 428/168; 428/187; 427/256; 427/257; 427/261; 427/475; 427/510; 522/81; 522/83; 522/77; 522/93; 522/96; 522/64; 524/786; 524/789; 524/790

(58) Field of Search .............................. 522/77, 81, 82, 522/83, 64, 96, 93, 182, 181, 170, 120, 121; 428/167, 168, 187, 141, 143, 144, 145; 524/441, 492, 493, 786, 789, 790; 427/510, 475, 256, 257, 261

(56) References Cited

U.S. PATENT DOCUMENTS 2,801,185 A   7/1957   Iler
3,267,187 A   8/1966   Slosberg et al.
3,506,474 A   4/1970   Neuhaus et al.

(List continued on next page.)

OTHER PUBLICATIONS

Gallouèdec et al., "Enhancement of mechanical and optical properties of waterborne polyurethane lacquers on plastic surfaces by using ultra–fine polyamide powders. A new apporach to "soft feel" coatings," *Waterborne, High–Solids, and Powder Coatings Symposium*, Feb. 14–16, 1996. New Orleans, LA.

(List continued on next page.)

Primary Examiner—Susan W. Berman
(74) Attorney, Agent, or Firm—Pennie & Edmonds LLP

(57) ABSTRACT

In one embodiment the present invention provides a coated substrate comprising a substrate, a radiation-cured coating or a thermally-cured on at least a portion of the substrate, wherein the coating comprises an inherent macroscopic texture. In another embodiment, the present invention provides a pre-cured coating mixture comprising a radiation-curable resin and an initiator, or a thermally-curable resin and thermal initiator, wherein the radiation- or thermally-curable resin and the respective initiator form a pre-cured coating mixture capable of forming a macroscopic texture upon application of the mixture on a substrate. In another embodiment the present invention provides a pre-cured coating mixture comprising a radiation- or thermally-curable resin, an initiator, and texture-producing particles having an effective size to provide a macroscopic texture upon application of the mixture on a substrate. In another embodiment, the present invention provides a coated substrate comprising a substrate and a radiation- or thermally-cured coating on at least a portion of the substrate, wherein the coating comprises an inherent macroscopic texture.

In addition, the present invention provides a process for making a coating on a substrate, comprising the steps of distributing a pre-cured coating mixture comprising a radiation-curable resin and an initiator or a thermally-curable resin and thermal initiator over at least a portion of a substrate to form a pre-cured coating having a macroscopic texture, and radiation-curing or thermally curing, respectively, the pre-cured coating to form a radiation-cured or thermally-cured coating having the macroscopic texture.

54 Claims, 20 Drawing Sheets

U.S. PATENT DOCUMENTS

| | | |
|---|---|---|
| 3,639,160 A | 2/1972 | Nelson |
| 3,816,155 A * | 6/1974 | Iverson et al. ............... 427/274 |
| 3,956,530 A | 5/1976 | McKee, Jr. et al. |
| 3,958,043 A | 5/1976 | McKee, Jr. et al. |
| 3,958,054 A | 5/1976 | McKee, Jr. et al. |
| 3,996,328 A | 12/1976 | Coffin et al. |
| 3,999,940 A | 12/1976 | Freeman |
| 4,008,349 A | 2/1977 | Ehrenfeld, Jr. et al. |
| 4,015,036 A | 3/1977 | Haemer |
| 4,022,643 A | 5/1977 | Clark |
| 4,036,673 A | 7/1977 | Murphy et al. |
| 4,059,709 A | 11/1977 | Conger et al. |
| 4,066,813 A | 1/1978 | Winters et al. |
| 4,068,030 A | 1/1978 | Witman |
| 4,071,592 A | 1/1978 | Frisch |
| 4,083,907 A | 4/1978 | Hamilton |
| 4,086,377 A | 4/1978 | Barchi |
| 4,089,296 A | 5/1978 | Barchi |
| 4,089,724 A | 5/1978 | Bomboire |
| 4,126,727 A | 11/1978 | Kaminski |
| 4,130,939 A | 12/1978 | Toal |
| 4,169,167 A | 9/1979 | McDowell |
| 4,187,131 A | 2/1980 | Shortway et al. |
| 4,191,581 A | 3/1980 | Hamilton |
| 4,212,691 A | 7/1980 | Potosky et al. |
| 4,214,028 A | 7/1980 | Shortway et al. |
| 4,217,385 A | 8/1980 | Shortway et al. |
| 4,232,076 A | 11/1980 | Stetson et al. |
| 4,244,899 A | 1/1981 | Henshaw |
| 4,248,922 A | 2/1981 | Shortway et al. |
| 4,263,051 A | 4/1981 | Crawford et al. |
| 4,264,643 A | 4/1981 | Granata et al. |
| 4,273,819 A | 6/1981 | Schmidle et al. |
| 4,274,916 A | 6/1981 | Grose |
| 4,277,427 A | 7/1981 | Kaminski et al. |
| 4,278,483 A | 7/1981 | Mansolillo |
| 4,298,646 A | 11/1981 | Haemer et al. |
| 4,304,815 A | 12/1981 | Cugasi, Jr. |
| 4,313,969 A | 2/1982 | Matthews et al. |
| 4,331,579 A | 5/1982 | Haemer |
| 4,337,296 A | 6/1982 | Varadhachary |
| 4,348,447 A | 9/1982 | Miller, Jr. et al. |
| 4,355,063 A | 10/1982 | Palmer et al. |
| 4,358,476 A | 11/1982 | Zimmer et al. |
| 4,361,626 A | 11/1982 | Boba et al. |
| D268,793 S | 4/1983 | Tejeda et al. |
| 4,388,760 A | 6/1983 | Aspy |
| 4,389,514 A | 6/1983 | Schmidle et al. |
| 4,393,187 A | 7/1983 | Boba et al. |
| 4,401,611 A | 8/1983 | Mansolillo et al. |
| 4,405,657 A | 9/1983 | Miller, Jr. et al. |
| 4,418,109 A | 11/1983 | Miller, Jr. et al. |
| 4,421,784 A | 12/1983 | Troue |
| 4,440,826 A | 4/1984 | Witman |
| 4,443,505 A | 4/1984 | Ehrenfeld, Jr. |
| 4,450,194 A * | 5/1984 | Kauffman et al. .......... 428/172 |
| 4,454,188 A | 6/1984 | Penta et al. |
| 4,456,643 A | 6/1984 | Colyer |
| 4,467,007 A | 8/1984 | Elgie |
| 4,478,876 A | 10/1984 | Chung |
| 4,483,732 A | 11/1984 | Penta et al. |
| 4,483,884 A | 11/1984 | Troue |
| 4,485,123 A | 11/1984 | Troue |
| 4,491,616 A | 1/1985 | Schmidle et al. |
| 4,501,783 A | 2/1985 | Hiragami et al. |
| 4,522,958 A | 6/1985 | Das et al. |
| 4,526,910 A | 7/1985 | Das et al. |
| 4,530,856 A | 7/1985 | Kauffman et al. |
| 4,547,245 A | 10/1985 | Colyer |
| 4,609,431 A | 9/1986 | Grose et al. |
| 4,618,530 A | 10/1986 | Stetson |
| 4,652,470 A | 3/1987 | Das et al. |
| 4,675,212 A | 6/1987 | Wiley et al. |
| 4,677,004 A | 6/1987 | Das et al. |
| 4,680,204 A | 7/1987 | Das et al. |
| 4,689,259 A | 8/1987 | Miller, Jr. et al. |
| 4,699,820 A | 10/1987 | Herr, Jr. et al. |
| 4,717,620 A | 1/1988 | Bowen et al. |
| 4,761,306 A | 8/1988 | Clark et al. |
| 4,794,020 A | 12/1988 | Lussi et al. |
| 4,816,317 A * | 3/1989 | Balmer et al. ............... 428/167 |
| 4,816,319 A * | 3/1989 | Dees et al. .................. 428/167 |
| 4,844,849 A | 7/1989 | Miller et al. |
| RE33,069 E | 9/1989 | Courtoy et al. |
| 4,931,331 A | 6/1990 | Owens |
| 4,958,399 A | 9/1990 | Toal et al. |
| RE33,599 E | 5/1991 | Courtoy et al. |
| 5,015,516 A | 5/1991 | Lussi et al. |
| 5,023,140 A | 6/1991 | Glotfelter et al. |
| 5,059,471 A | 10/1991 | McNally et al. |
| 5,077,112 A | 12/1991 | Hensel et al. |
| 5,080,954 A | 1/1992 | Mackey, Sr. et al. |
| H1029 H | 3/1992 | Reinhart |
| 5,104,929 A | 4/1992 | Bilkadi |
| 5,120,811 A | 6/1992 | Glotfelter et al. |
| 5,124,202 A | 6/1992 | Fernando et al. |
| 5,153,047 A | 10/1992 | Mackey, Sr. et al. |
| 5,178,912 A | 1/1993 | Piacente et al. |
| 5,208,086 A | 5/1993 | Owens |
| 5,246,764 A | 9/1993 | LaPorte et al. |
| 5,252,655 A | 10/1993 | Parker et al. |
| 5,260,118 A | 11/1993 | Lussi et al. |
| 5,290,591 A | 3/1994 | Lussi et al. |
| 5,308,683 A | 5/1994 | Dees, Jr. et al. |
| 5,316,855 A | 5/1994 | Wang et al. |
| 5,336,693 A | 8/1994 | Frisch |
| 5,344,704 A | 9/1994 | O'Dell et al. |
| 5,348,760 A | 9/1994 | Parker et al. |
| 5,401,560 A | 3/1995 | Williams |
| 5,411,811 A | 5/1995 | Piacente et al. |
| 5,460,701 A | 10/1995 | Parker et al. |
| 5,494,729 A | 2/1996 | Henry et al. |
| 5,506,030 A * | 4/1996 | Landers et al. ............. 428/141 |
| 5,531,944 A | 7/1996 | Frisch |
| 5,536,530 A | 7/1996 | Landers et al. |
| 5,536,571 A | 7/1996 | Pearson et al. |
| 5,543,173 A | 8/1996 | Horn, Jr. et al. |
| 5,571,588 A | 11/1996 | Lussi et al. |
| 5,585,415 A | 12/1996 | Gorzalski et al. |
| 5,618,577 A | 4/1997 | Pearson et al. |
| 5,627,231 A | 5/1997 | Shalov et al. |
| 5,643,669 A | 7/1997 | Tsuei |
| 5,645,889 A | 7/1997 | Potosky et al. |
| 5,648,407 A | 7/1997 | Goetz et al. |
| 5,679,443 A | 10/1997 | Barrows et al. |
| 5,712,018 A | 1/1998 | Frisch |
| 5,718,907 A | 2/1998 | Labarre |
| 5,728,332 A | 3/1998 | Frisch et al. |
| 5,733,630 A | 3/1998 | Frisch et al. |
| 5,736,008 A | 4/1998 | Barrows et al. |
| 5,737,851 A | 4/1998 | Novak et al. |
| 5,760,126 A | 6/1998 | Engle et al. |
| 5,763,048 A | 6/1998 | Takahashi |
| 5,830,937 A | 11/1998 | Shalov et al. |
| 5,853,809 A | 12/1998 | Campbell et al. |
| 5,858,160 A | 1/1999 | Piacente et al. |
| 5,874,684 A | 2/1999 | Parker et al. |
| 5,928,778 A | 7/1999 | Takahashi et al. |
| 5,965,198 A | 10/1999 | Plusquellec et al. |
| 6,218,001 B1 | 4/2001 | Chen et al. |
| 6,228,463 B1 | 5/2001 | Chen et al. |

| | | | |
|---|---|---|---|
| 6,291,078 B1 | 9/2001 | Chen et al. | 428/543 |
| 6,399,670 B1 * | 6/2002 | MacQueen et al. | 522/142 |
| 2001/0028945 A1 * | 10/2001 | Chen et al. | 428/292.1 |

OTHER PUBLICATIONS

Hoorn et al., 1995, "Metal–binding affinity of a series of ω–amino–alkylbenzimidazoles immobilized on silica," *Reactive and Functional Polymers* 27:223–235.

Misra et al., 1998, "Hybrid inorganic–organic UV–curable abrasion–resistant coatings," *Surface Coatings International* 12:594–595.

Gallouedec et al., "Optimizing the use of ultrafine microporous polyamide powders to obtain low–gloss UV curable coatings," *RADTECH Report*, Sep./Oct. 1995, pp. 18–24.

* cited by examiner

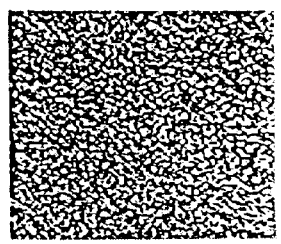
FIG. 11
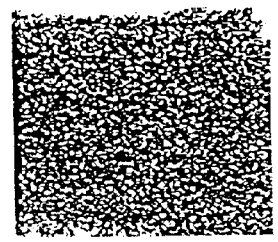
FIG. 12
FIG. 13
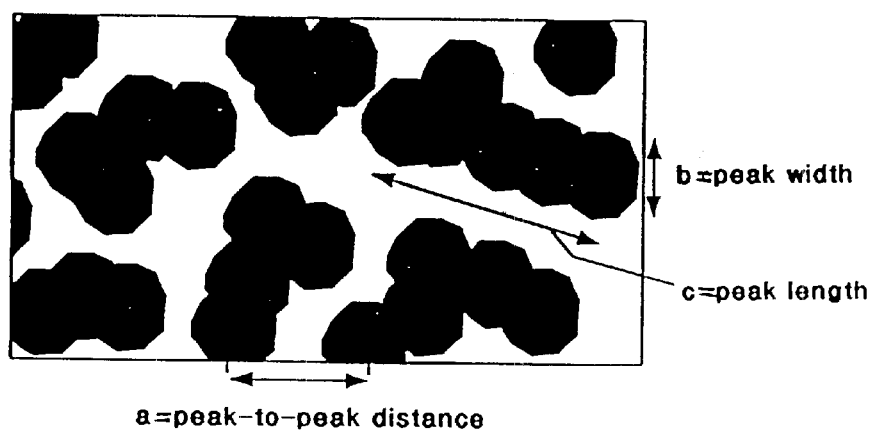

a = distance between branches    c = branch length b = branch width

COATING HAVING MACROSCOPIC TEXTURE AND PROCESS FOR MAKING SAME

BACKGROUND OF THE INVENTION

This application is a continuation-in-part of U.S. application Ser. No. 09/489,420 filed Jan. 21, 2000 now U.S. Pat. No. 6,399,670.

FIELD OF THE INVENTION

The invention relates generally to a coating composition and process for making and applying the coating. More specifically, the invention relates to radiation-cured and thermally-cured coatings having a macroscopic texture that provides superior abrasion resistance and unique aesthetic qualities.

DESCRIPTION OF RELATED ART

Radiation-curable coatings are used in many applications throughout the coatings industry, such as protective coatings for various substrates, including plastic, metal, wood, ceramic, and others, and the advantages of radiation-curing compared to thermal curing are well known in the art. These coatings are typically resin-based mixtures that are usually cured using ultraviolet (UV) radiation. The resins are typically mixtures of oligomers and monomers that polymerize upon exposure to UV radiation resulting in a cured coating.

Various other components may be added to the resin mixture. A photosensitizer or photoinitiator may be added to cause cross-linkage of the polymers upon exposure to UV radiation. Flatting agents, such as silica, may be added to reduce or control the level of gloss in the cured coating; however, U.S. Pat. No. 4,358,476 discloses that excessive concentrations of flatting agents may result in undesirably high viscosities impeding proper application of the coating to a substrate, potential separation of the resin into separate phases, and a deleterious effect on the efficacy of the UV radiation. U.S. Pat. No. 5,585,415 describes the use of a pigmented composition and various photoinitiators that produce a uniform microscopic surface wrinkling that provides a low gloss surface without the use of flatting agents. Various other components, such as fillers, plasticizers, antioxidants, optical brighteners, defoamers, stabilizers, wetting agents, mildewcides and fungicides, surfactants, adhesion promoters, colorants, dyes, pigments, slip agents, fire and flame retardants, and release agents, may also be added to the resin mixture to provide additional functionality.

An important aspect of these coatings is their level of scratch or abrasion resistance. Good abrasion resistance is desirable so that the integrity and appearance of the coating is maintained. For example, a superior abrasion-resistant coating would be desirable for a flooring substrate, since flooring is typically exposed to a variety of abrasives. Improvements in the abrasion-resistance of coatings has been accomplished through various techniques. U.S. Pat. No. 4,478,876 describes the addition of colloidal silica to hydrolyzable silanes and polymers derived from a combination of acryloxy functional silanes and polyfunctional acrylate monomers. Another technique is the use of compositions containing acrylate or methacrylate functionalities on a monomer, oligomer, or resin. U.S. Pat. No. 5,104,929 describes the use of colloidal silica dispersions in certain acrylate or methacrylate ester monomers or mixtures thereof. U.S. Pat. No. 5,316,855 describes the use of a cohydrolyzed metal alkoxide sol with a trialkoxysilane-containing organic component having the trialkoxysilane.

These radiation-cured coatings generally have a substantially smooth, exposed surface such that there is no macroscopic texture or texture visible to the naked eye. This type of smooth surface provides for ease of cleaning. Some radiation-cured coatings have a microscopic texture as described in U.S. Pat. No. 5,585,415. The individual features of this texture are not visible to the naked eye, but the combined effect of the microscopic texture results in the scattering of visible light that results in a matte or low gloss appearance. This texture is provided by the coating curing process which results in microscopic wrinkles on the surface of the coating. While the microscopic dimensions of this texture provide a matte finish, these dimensions also make the coating susceptible to particle entrapment within the microscopic wrinkles. This particle entrapment results in a visibly dirty surface that is difficult to clean. Another microscopic texture found in radiation-curable coatings results from the addition of flatting agents to the uncured coating mixture. During the curing process these flatting agents, which are small inorganic or organic particles, concentrate at the coating surface to form a microscopically rough surface that scatters visible light resulting in a matte finish. The size of the particle used is typically such that it is no larger in diameter than the average thickness of the cured coating. Particles much larger than the coating thickness do not result in a matte finish and are not desired. Since most radiation-cured coatings are no more than 75–100 μm thick, and since UV radiation can not typically penetrate any deeper, typical flatting agent particles for UV-cured coatings range in size from 0.1–100 μm, depending upon average coating thickness. Flatting agents are well known in the art as described, for example, in F.D.C. Gallouedec et al., "Optimization of Ultrafine Microporous Powders to Obtain Low-Gloss UV Curable Coatings," Radtech Report, Sepember/October 1995, pp 18–24.

To produce such macroscopically smooth surfaces requires the application of a coating mixture that can be easily distributed across the substrate to be coated. If the coating mixture has a high viscosity, for example, the coating will not distribute smoothly. Therefore, it is preferable to use a lower viscosity coating to produce such a macroscopically smooth coating surface.

Thermally-cured coatings are also used in many applications throughout the coatings industry for various substrates such as plastic, metal, wood, ceramic, and others. Thermally-cured coatings are similar to radiation-cured coatings in that they typically comprise resin-based mixtures of oligomers and monomers that polymerize upon curing. Instead of using radiation to cure or polymerize the resin, however, heat is used to affect polymerization. As such, a thermally-activated initiator is used to initiate polymerization, rather than a photosensitizer or photoinitiator. However, various other components may be added to the thermally-curable resin mixture, including the same components that are added to radiation-curable resin mixture, such as flatting agents, fillers, plasticizers, antioxidants, optical brighteners, defoamers, stabilizers, wetting agents, mildewcides and fungicides, surfactants, adhesion promoters, colorants, dyes, pigments, slip agents, fire and flame retardants, and release agents.

Similar to the radiation-cured coatings, however, thermally-cured coatings are also substantially smooth from a macroscopic perspective. Also, to produce such macroscopically smooth surfaces requires the application of a coating mixture that can be easily distributed across the substrate to be coated. If the coating mixture has a high viscosity, for example, the coating will not distribute smoothly. Therefore, as with radiation-cured coatings, it is preferable to use a lower viscosity coating to produce such a macroscopically smooth coating surface.

Other coatings provide a macroscopically textured surface but by methods other than radiation-curing or thermal-curing. In chemical embossing, for example, a macroscopic texture is formed based upon the use of various chemicals added to the substrate. In mechanical embossing, the substrate itself is imprinted with the desired textural pattern. In both types of embossing, the subsequently applied coating naturally conforms to the shape of the substrate textural pattern. However, any desired change to the textural pattern requires changes in the amount and type of chemicals added to the substrate and/or the replacement of the roller used to mechanically imprint the pattern on the substrate, which can be significantly expensive and time consuming. Furthermore, neither the coating itself or its application are inherently providing the desired texture. In another form of mechanical embossing, texture may be achieved by impressing a given pattern on the cured coating itself. Similarly, however, the texture is not produced inherently by the coating itself or its application.

Based on the foregoing, there is a need for a superior abrasion-resistant, radiation-cured and thermally-cured coatings for various substrates including plastic, metal, wood, and ceramic, among others, having a macroscopic texture. In addition, there is a need for a coating having a macroscopic texture that is easily cleanable and that provides certain aesthetic properties. Further, there is a need for a method to produce such a superior abrasion-resistant, radiation-cured coating having a macroscopic texture using a high viscosity pre-cured coating mixture and/or texture-producing particles.

SUMMARY OF THE INVENTION

In one embodiment the present invention provides a coated substrate comprising a substrate, a radiation-cured coating on at least a portion of the substrate, wherein the coating comprises an inherent macroscopic texture. In another embodiment, the present invention provides a pre-cured coating mixture comprising a radiation-curable resin and an initiator, wherein the radiation-curable resin and the initiator form a pre-cured coating mixture capable of forming a macroscopic texture upon application of the mixture on a substrate. In another embodiment the present invention provides a pre-cured coating mixture comprising a radiation-curable resin, an initiator, and texture-producing particles having an effective size to provide a macroscopic texture upon application of the mixture on a substrate.

In yet another embodiment, the present invention provides a coated substrate comprising a substrate, a thermally-cured coating on at least a portion of the substrate, wherein the coating comprises an inherent macroscopic texture. In another embodiment, the present invention provides a pre-cured coating mixture comprising a thermally-curable resin and a thermal initiator, wherein the thermally-curable resin and the thermal initiator form a pre-cured coating mixture capable of forming a macroscopic texture upon application of the mixture on a substrate. In another embodiment the present invention provides a pre-cured coating mixture comprising a thermally-curable resin, a thermal initiator, and texture-producing particles having an effective size to provide a macroscopic texture upon application of the mixture on a substrate.

In addition, the present invention provides a process for making a coating on a substrate, comprising the steps of distributing a pre-cured coating mixture comprising a radiation-curable resin and an initiator or a thermally-curable resin and thermal initiator over at least a portion of a substrate to form a pre-cured coating having a macroscopic texture, and radiation-curing or thermally curing, respectively, the pre-cured coating to form a radiation-cured or thermally-cured coating having the macroscopic texture.

The coating of the present invention provides a top coat or protective coating having a macroscopic texture to substrates containing plastic such as polyvinyl chloride, metal, cellulose, fiberglass, wood, and ceramic, among others. In a preferred embodiment the coating of the present invention is used in connection with sheet flooring. In an additionally preferred embodiment, the coating of the present invention is used in connection with floor tiles. The coating of the present invention provides superior scratch or abrasion resistance and good transparency. In addition, the coating of the present invention is easily cleanable, and the macroscopic texture provides an aesthetic aspect to the coating.

Other embodiments and features of the present invention will appear from the following description in which the preferred embodiments are set forth in detail in conjunction with the accompanying drawings.

BRIEF DESCRIPTION OF THE DRAWINGS

FIG. 11 is an illustration of the coated texture of FIG. 9;

FIG. 12 is an illustration of the coated texture of FIG. 10;

FIG. 13 is an illustration of the general type of macroscopic texture according to one embodiment of the present invention;

DETAILED DESCRIPTION OF THE PREFERRED EMBODIMENTS

Figure 1:
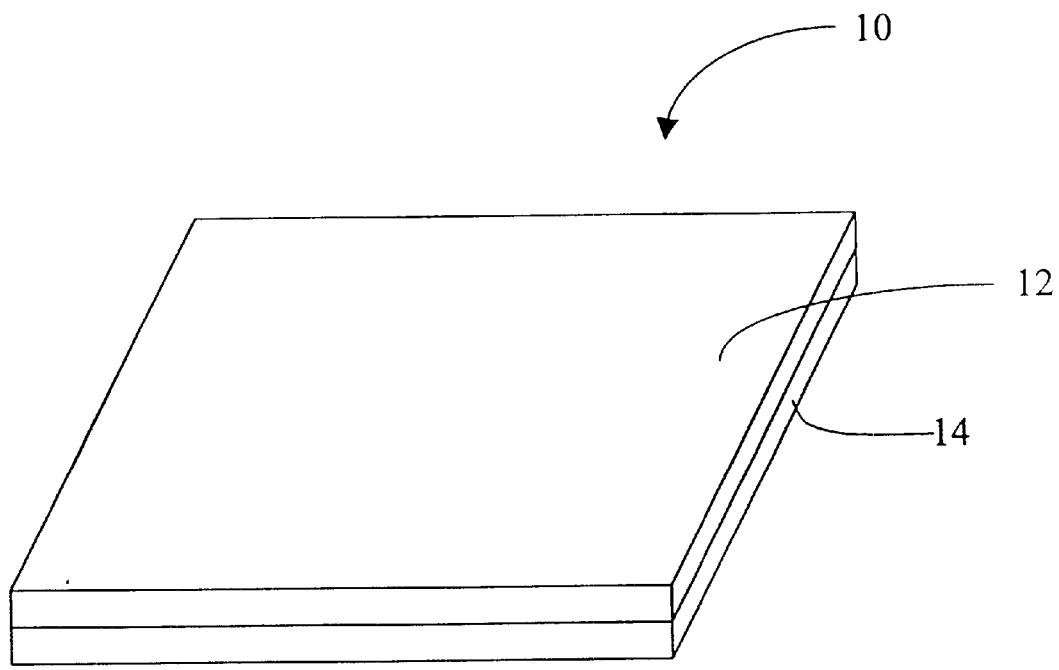
FIG. 1 illustrates a perspective view of a coated substrate 10 according to one embodiment of the present invention.

The present invention provides a coating having a macroscopic texture that exhibits superior abrasion-resistance, aesthetic value, and ease of cleaning. It should be appreciated that an important aspect of the present invention is that the macroscopic texture is provided inherently by the coating itself. In addition, the present invention provides a pre-cured coating mixture and a process for using the pre-cured coating mixture to generate the coating of the present invention on a substrate.

It should be appreciated that the term "coating" refers to the cured coating that typically would reside as an outer or exposed layer on a substrate after it has been cured or finally processed. The terms "radiation-cured" and "thermally-cured" mean after curing has occurred; therefore, the coating of the present invention, for example, may also be referred to as a "radiation-cured coating" or a "thermally-cured coating." The terms "radiation-curable" and "thermally-curable" mean prior to curing or capable of being cured, and the term "pre-cured" means prior to curing.

In one embodiment of the present invention, the pre-cured coating mixture generally comprises a radiation-curable resin and an initiator. The radiation-curable resin may be any resin capable of being cured using radiant energy. Radiant energy can be transferred through wave phenomenon and subatomic particle movement. Most preferred forms of radiant energy are ultraviolet (UV) and electron beam energy. Preferably, the radiation-curable resin comprises organic monomers, oligomers, or both. U.S. Pat. Nos. 4,169,167, 4,358,476, 4,522,958, 5,104,929, 5,585,415, 5,648,407, and 5,858,809, incorporated herein by reference, describe various resins, including crosslinkable (thermosetting) resins, that may be used in the present invention.

More preferably, the radiation-curable resin comprises a mixture of crosslinkable monomers and oligomers that contain on average from 1–20 reactive groups per molecule of monomer or oligomer, where the reactive group provides the functionality for polymerization upon exposure to radiation. More preferably, the number of reactive groups per molecular is from 1–6. Preferred reactive groups include acrylate, vinyl, lactone, oxirane, vinyl ether, and hydroxyl. More preferred reactive groups include acrylate, oxirane, vinyl ether, and hydroxyl. The most preferred monomers and oligomers, however, are acrylates. Acrylates have the following structure:

where R can be hydrogen, or alkyl, including, but not limited to, methyl, ethyl, propyl, butyl, etc. These radiation-curable resins are readily available or may be synthesized by procedures well known to one of skill in the art. It is noted that the term "radiation-cured groups" refers to these reactive groups after they have been cured.

The oligomers and monomers can also have 1–100 non-radiation-curable functional groups per molecule of monomer or oligomer. Preferred non-radiation-curable functional groups include urethane, melamine, triazine, ester, amide, ethylene oxide, propylene oxide, and siloxane. More preferred non-reactive groups are urethane ester, ethylene oxide, and propylene oxide.

As will be further described below in connection with the process for making the coating of the present invention, the concentration of the radiation-curable resin is dependent upon several factors. In one preferred embodiment, the concentration of the radiation-curable resin is selected to provide an effective or desired viscosity of the pre-cured coating mixture. The effective viscosity of the pre-cured coating mixture is that viscosity capable of producing a macroscopic texture, described below, upon application of the pre-cured coating mixture to a substrate and subsequent curing. Preferably, the viscosity of the pre-cured coating mixture is approximately 100,000–1,000,000 cPs at a shear rate of 0.150 s$^{-1}$ at the application temperature. Therefore, the radiation-cured resin may comprise approximately 50–99%, by weight of the pre-cured coating mixture to provide the desired viscosity. Preferably, the radiation-cured resin comprises approximately 70–99%, by weight, of the pre-cured coating mixture. Of course, the viscosity of the pre-cured coating mixture, and, therefore, the concentration of the radiation-curable resin, will be affected by the use of additional components in the pre-cured coating mixture such as rheological control agents, which will be described below. Other factors that affect the concentration of the radiation-curable resin are well known to one of skill in the art.

The initiator may be any chemical capable of assisting or catalyzing the polymerization and crosslinking of the radiation-curable resin upon exposure to radiation. The initiator may generally be a photoinitiator or photosensitizer. Such initiators are well known in the art and may be selected based upon the curing conditions used (e.g., curing in an inert environment or in air). Specifically, the initiator may be a free radical photoinitiator, a cationic photoinitiator, and mixtures of both of these. Preferred free radical photoinitiators include acyl phosphine oxide derivatives, benzophenone derivatives, and mixtures thereof. Preferred cationic photoinitiators include triarylsulphonium salts, diaryliodonium salts, ferrocenium salts, and mixtures thereof. It should be appreciated that the initiator refers to the initiator both before and after curing. Therefore, the initiator may have a different chemical structure or composition in the radiation-cured coating after exposure to radiation.

The concentration of a particular initiator is that amount necessary to provide satisfactory curing for a given pre-cured resin based upon the properties of that particular initiator. Such concentrations can be readily identified by one of skill in the art. A preferred concentration of the initiator is 0.01–10 parts per hundred resin (phr), and a more preferred concentration is 0.1–4 phr.

The pre-cured coating mixture may also comprise a rheological control agent (RCA), particularly if the pre-cured coating mixture does not have an inherent viscosity that is high enough to form a macroscopic texture upon application of the pre-cured coating mixture to a substrate. The RCA may be inorganic particles, organic solids, and mixtures of both.

The inorganic particles may be any inorganic solid having a size that is small enough to be included in the pre-cured coating mixture without deleteriously affecting the pre-cured coating mixture's ability to cure and adhere to a substrate. The particle should also be sufficiently small and/or closely match the refractive index of the cured coating such that the opacity of the cured coating is minimized. The particle should also not deleteriously affect the cured coating's abrasion resistance and in some cases it can improve that property. Additionally, the particle should not deleteriously affect the resistance of the cured coating to chemical attack by strongly basic aqueous media (i.e., the alkali resistance of the coating), since such alkali resistance is important in flooring materials. It should be appreciated that the size of these particles is such that they do not directly provide or contribute to the macroscopic texture. Preferred sizes of the inorganic particles are 1–100 nm, where 10–60 nm are most preferred.

Preferably, the inorganic particles are metal oxides, metals, or carbonates, where metal oxides are preferred. More preferably, the inorganic particles are alumina, aluminosilicates, alumina coated on silica, silica, fumed alumina, fumed silica, calcium carbonate, and clays. Still more preferred is alumina due to its superior hardness (for abrasion resistance) and for its greater alkali resistance relative to silica. Most preferred is nanometer-sized alumina with a particle size range of 27–56 nm due to the enhanced cured coating transparency afforded by such small particles when they are well-dispersed (e.g., through the use of an appropriate amount and type of coupling agent). However, since alumina has a higher refractive index (i.e., ~1.7) than most organic coatings and silica (both ~1.5), it may be envisioned that a nanometer-sized aluminosilicate material will give the optimal combination of transparency, abrasion resistance, and alkali resistance.

The inorganic particles may comprise approximately 1–80%, by weight, of the pre-cured coating mixture, more preferably 1–50%, by weight, and most preferably 1–25%, by weight. Even more preferably, if nanometer-sized alumina is used, its concentration is approximately 1–40%, by weight, of the pre-cured coating mixture. If fumed silica is used, its concentration is approximately 1–10%, by weight, of the pre-cured coating mixture. If nanometer-sized crystalline silica is used, its concentration is approximately 10–30%, by weight, of the pre-cured coating mixture. If exfoliated clay is used, its concentration is approximately 10–30%, by weight, of the pre-cured coating mixture.

Similarly, the organic solids may be any organic solid having a size that is small enough to be included in the pre-cured coating mixture without deleteriously affecting the pre-cured coating mixture's ability to cure and adhere to a substrate. As with the inorganic particles, the organic particles should also not deleteriously affect the cured coating's transparency or abrasion resistance. Unlike the inorganic particles, the organic particles may dissolve or partially dissolve into the pre-cured resin at elevated temperature and thicken the pre-cured coating mixture upon cooling. The organic solids may be low molecular weight waxes containing functionality such as acid, amine, amide, hydroxyl, urea; polymers of ethylene glycol; polymers of propylene glycol; natural polymers such as guar, gelatin, and corn starch; polyamides; polypropylene; and mixtures of any of these. Most preferred are functional waxes. The organic solids may comprise approximately 1–50%, by weight, of the pre-cured coating mixture. More preferably, the organic solids comprise between approximately 1–20%, by weight. Most preferably, if functional waxes are used, their concentration is approximately 1–10%, by weight, of the pre-cured coating mixture. As will be described below in connection with the process for making the coating of the present invention, the RCA may added for several purposes.

A coupling agent or dispersing agent may also be added for purpose of aiding the dispersion of the RCA in the pre-cured coating mixture. The coupling agent may be any material that provides surfactant-like properties and is capable of enhancing the dispersion of the RCA in the pre-cured coating mixture, in particular, the dispersion of inorganic particles. The coupling agent ideally forms a chemical and/or physical bond with the pre-cured coating mixture and the inorganic particle, which improves the adhesion of the particle to the pre-cured coating mixture. Generally, the coupling agent is a organo-silicon or organo-fluorine containing molecule or polymer. Preferred organo-silicon materials are organosilanes and more preferably a prehydrolyzed organosilane. The coupling agent may also be vinyl phosphonic acid or mixtures of phosphonic acid with the prehydrolyzed organosilane. The concentration of the dispersing agent may be approximately 0.1–20%, by weight, in the pre-cured coating mixture, and more preferably approximately 0.1–15%, by weight.

A flatting agent may also be added to the pre-cured coating mixture of the present invention. Flatting agents are well known in the art. Preferred flatting agents include organic particles having a size of approximately 0.1–100 microns, inorganic particles having a size of approximately 0.1–100 microns, and mixtures of both. When flatting agents are used, a coupling agent may be needed to obtain good dispersion in the pre-cured coating mixture and good adhesion between the particle and the cured coating. For inorganic flatting agents, preferred coupling agents are organosilanes, mixtures of organosilanes, and low surface tension monomers and oligomers. For organic flatting agents, preferred coupling agent include organosilanes, mixtures of organosilanes, and low surface tension monomers and oligomers. The particle size selected is such that it is about the same size as the coating thickness or smaller. More preferred flatting agents include silica, alumina, polypropylene, polyethylene, waxes, ethylene copolymers, polyamide, polytetrafluoroethylene, urea-formaldehyde and combinations thereof. The concentration of the flatting agent may be approximately 2–25%, by weight, of the pre-cured coating mixture, and more preferably is 5–20%, by weight.

In addition to the foregoing components of the pre-cured coating mixture, texture-producing particles may also be added. Such texture-producing particles have an effective size or an average diameter that is larger than the pre-cured coating thickness after it has been applied to a substrate. These texture-producing particles, therefore, may act to provide the macroscopic texture of the coating of the present invention. It should be appreciated that these texture-producing particles may be added to a pre-cured coating mixture that has an effective viscosity for macroscopic texture or to a pre-cured coating mixture that does not have an effective viscosity for macroscopic texture. In the latter case, the macroscopic texture would be produced only by the texture-producing particles.

The degree of texture provided by the texture-producing particles is controlled by the ratio of the particle size to the thickness of the cured coating. As this ratio increases from 1, the texture becomes macroscopic and can be made more aggressive (visibly more rough) as the ratio is increased. The degree of aggressiveness of the texture is determined by the desired end use properties such as abrasion resistance and cleanability. It is important that the particles selected have good adhesion to the cured coating. These particles can be inorganic or organic materials. A coupling agent may be necessary to obtain good dispersion in the pre-cured coating mixture and good adhesion between the particle and the cured coating. Preferred inorganic particles are glass, ceramic, alumina, silica, aluminosilicates, and alumina coated on silica. Preferred coupling agents for inorganic texture-producing particles are organosilanes. Preferred organic particles are thermoplastic and thermosetting polymers. For inorganic flatting agents, preferred coupling agents are organosilanes, mixtures of organosilanes, and low surface tension monomers and oligomers. For organic flatting agents, preferred coupling agents include organosilanes, mixtures of organosilanes, and low surface tension monomers and oligomers. Most preferred organic particles are polyamide, including nylons, specifically, nylon 6 and nylon 12 (although one of skill in the art will recognize that other nylons may be used in the present invention), polypropylene, polyethylene, polytetrafluoroethylene, ethylene copolymers, waxes, epoxy, and urea-formaldehyde. Preferred average particle size of both organic and inorganic particles is 30–350 μm. Most preferred is 30–150 μm. Preferred concentration of particles in the pre-cured coating mixture is 1–30%, by weight. The most preferred concentration is 5–15% by weight.

A preferred embodiment of a pre-cured coating mixture of the present invention comprises, by weight, 79.44% of a resin mixture comprising, by weight, 53.4% urethane acrylate (ALUA 1001, available from Congoleum Corporation, Mercerville, N.J.), 8.8% ethoxylated diacrylate (SR 259 available from Sartomer, Exton, Pa.), 24.3% propoxylated diacrylate (SR 306 available from Sartomer, Exton, Pa.), 13.4% ethoxylated trimethlyolpropane triacrylate (SR 454 available from Sartomer, Exton, Pa.), and 0.1% acylphosphine oxide (LUCIRIN TPO available from BASF, Charlotte N.C.); 12.00% flatting agent comprising 5 micron nylon particles (ORGASOL 2001 UD available from Atofina, Philadelphia, Pa.); 6.25% texture-producing particles comprising 60 micron nylon 12 particles (ORGASOL 2002 ES 6 available from Atofina, Philadelphia, Pa.); 2.00% alumina RCA having a particle size distribution in the range of 27–56 nm (NANOTEK ALUMINA #0100 available from Nanophase Technologies Corp. Burr Ridge, Ill.); and 0.31% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below. As such, a preferred cured coating according to the present invention is that coating produced using the above preferred pre-cured coating mixture. In particular, this pre-cured coating mixture and the resulting cured coating are preferred for use on sheet flooring as a substrate.

An even more preferred embodiment of a pre-cured coating mixture of the present invention comprises, by weight, 84.59% of a resin mixture comprising, by weight, 53.4% urethane acrylate (ALUA 1001, available from Congoleum Corporation, Mercerville, N.J.), 8.8% ethoxylated diacrylate (SR 259 available from Sartomer, Exton, Pa.), 24.3% propoxylated diacrylate (SR 306 available from Sartomer, Exton, Pa.), 13.3% ethoxylated trimethlyolpropane triacrylate (SR 454 available from Sartomer, Exton, Pa.), and 0.2% acylphosphine oxide (LUCIRIN TPO available from BASF, Charlotte, N.C.); 8.0% flatting agent comprising 5 micron nylon particles (ORGASOL 2001 UD available from Atofina, Philadelphia, Pa.); 6.25% texture-producing particles comprising 60 micron nylon 12 particles (ORGASOL 2002 ES 6 available from Atofina, Philadelphia, Pa.); 1.0% alumina RCA having a particle size distribution in the range of 27–56 nm (NANOTEK ALUMINA #0100 available from Nanophase Technologies Corp. Burr Ridge, Ill.); and 0.16% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below. As such, a preferred cured coating according to the present invention is that coating produced using the above preferred pre-cured coating mixture. In particular, this pre-cured coating mixture and the resulting cured coating are preferred for use on sheet flooring as a substrate.

In another preferred embodiment, a pre-cured coating mixture for use with tile as the substrate comprises, by weight, 35.303% ethoxylated trimethylolpropane triacrylate (SR 454, available from Sartomer, Exton, Pa.), 41.050% polyester acrylate (LAROMER PE56F, available from BASF, Charlotte, N.C.), 5.747% urethane acrylate (ALUA 1001, available from Congoleum Corporation, Mercerville, N.J.), 0.330% acylphosphine oxide (LUCIRIN TPO, available from BASF, Charlotte, N.C.), 8.000% 3 micron inorganic flatting agent (ACEMATTE OK 412, available from Degussa Corp., Ridgefield Park, N.J.), 2.323% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below, 1.000% inorganic RCA (NANOTEK ALUMINA #0100, available from Nanophase Technologies, Burr Ridge, Ill.), and 6.250% 60 micron texture-producing particle (ORGASOL 2002 ES6, available from Atofina, Philadelphia, Pa.). As such, a preferred cured coating according to the present invention is that coating produced using the above preferred pre-cured coating mixture.

In another embodiment of the present invention, the pre-cured coating mixture comprises a thermally-curable resin and a thermal initiator. The thermally-curable resin may be any resin capable of being cured using thermal energy. The thermally-curable resins preferably include organic monomers, oligomers, or both. U.S. Pat. Nos. 4,169,167, 4,358,476, 4,522,958, 5,104,929, 5,585,415, 5,648,40, and 5,858,809, incorporated herein by reference, describe various resins, including crosslinkable (thermosetting) resins, that may be used in the present invention. The thermal initiator used for thermally-curable coatings of the present invention is any thermal initiator known in the art. Preferably, the free radical thermal initiator is an organic peroxide, such as tertiary-butyl peroxybenzoate.

More preferably, the thermally-curable resin comprises a mixture of crosslinkable monomers and oligomers that contain on average from 1–20 reactive groups per molecule of monomer or oligomer, where the reactive group provides the functionality for polymerization upon exposure to heat. More preferably, the number of reactive groups per molecular is from 1–6. Preferred reactive groups include acrylate, vinyl, lactone, oxirane, vinyl ether, and hydroxyl. More preferred reactive groups include acrylate, oxirane, vinyl ether, and hydroxyl. The most preferred monomers and oligomers, however, are acrylates. Acrylates have the following structure:

$CH_2=CR—CO—$ where R can be hydrogen, or alkyl, including, but not limited to, methyl, ethyl, propyl, butyl, etc. These thermally-curable resins are readily available or may be synthesized by procedures well known to one of skill in the art. It is noted that the term "thermally-cured groups" refers to these reactive groups after they have been cured.

The oligomers and monomers can also have 1–100 non-thermally-curable functional groups per molecule of ester, amide, ethylene oxide, propylene oxide, and siloxane. More preferred non-reactive groups are urethane, ethylene oxide, and propylene oxide.

As will be further described below in connection with the process for making the coating of the present invention, the concentration of the thermally-curable resin is dependent upon several factors. In one preferred embodiment, the concentration of the thermally-curable resin is selected to provide an effective or desired viscosity of the pre-cured coating mixture. The effective viscosity of the pre-cured coating mixture is that viscosity capable of producing a macroscopic texture, described below, upon application of the pre-cured coating mixture to a substrate and subsequent curing. Preferably, the viscosity of the pre-cured coating mixture is approximately 100,000–1,000,000 cPs at a shear rate of $0.150\ s^{-1}$ at the application temperature. Therefore, the thermally-cured resin may comprise approximately 50–99%, by weight of the pre-cured coating mixture to provide the desired viscosity. Preferably, the thermally-cured resin comprises approximately 70–99%, by weight, of the pre-cured coating mixture. Of course, the viscosity of the pre-cured coating mixture, and, therefore, the concentration of the thermally-curable resin, will be affected by the use of additional components in the pre-cured coating mixture such as rheological control agents, which will be described below. Other factors that affect the concentration of the thermally-curable resin are well known to one of skill in the art.

As with the radiation-curable coatings of the present invention, the thermally-cured coatings of the present invention also provide a macroscopic texture. A such, the same rheological control agents, coupling agents, flatting agents, and texture-producing particles previously described may be used with the thermally-curable coatings of the present invention. The manner of use of these agents with the thermally-curable coatings of the present invention is the same as previously described for the radiation-curable coatings.

A preferred embodiment of a thermally pre-cured coating mixture of the present invention comprises, by weight, 44.83% urethane acrylate (ALUA 1001, available from Congoleum Corporation, Mercerville, N.J.), 6.92% ethoxylated diacrylate (SR 259 available from Sartomer, Exton, Pa.), 20.53% propoxylated diacrylate (SR 306 available from Sartomer, Exton, Pa.), 11.25% ethoxylated trimethlyolpropane triacrylate (SR 454 available from Sartomer, Exton, Pa.), 1.06% tertiary-butyl peroxybenzoate (P-20 available from Norac, Azusa, Calif.,) 8% flatting agent comprising 5 micron nylon 12 particles (ORGASOL 2001 UD available from Atofina, Philadelphia, Pa.), 6.25% texture-producing particles comprising 60 micron nylon 12 particles (ORGASOL 2002 ES6 available from Atofina, Philadelphia, Pa.), 1% alumina RCA having a particle size distribution in the range of 27–56 nm, and nominally 35 nm, (NANOTEK ALUMINA #0100 available from Nanophase Technologies Corp. Burr Ridge, Ill.), and 0.16% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below. As such, a preferred cured coating according to the present invention is that coating produced using the above preferred pre-cured coating mixture. Another preferred embodiment is the use of the foregoing pre-cured coating mixture and resulting cured coating with sheet flooring as the substrate.

It should be appreciated that many additional components known in the art may be added to the coatings of the present invention. These additional components may include fillers, plasticizers, antioxidants, optical brighteners, defoamers, stabilizers, wetting agents, mildewcides and fungicides, surfactants, adhesion promoters, colorants, dyes, pigments, slip agents, fire and flame retardants, and release agents.

FIG. 1 illustrates a perspective view of a coated substrate 10 according to one embodiment of the present invention. In FIG. 1 a coating 12 is adhered to a substrate 14, where the coating 12 is produced by curing the pre-cured coating mixture made according to the present invention either being a radiation-curable coating mixture or a thermally-curable coating mixture. It should be appreciated that the coating of the present invention may be used in conjunction with any substrate that is capable of remaining attached to the coating after curing. Substrates that may be used include those containing plastic such as polyvinyl chloride, metal, cellulose, fiberglass, wood, and ceramic, among others. Preferably, the substrate is a flooring material, such as a floor tile or flexible sheet, where the surface of the coating having the macroscopic texture is the exposed surface of the flooring or that surface upon which one would walk. The superior scratch resistance of the coating of the present invention, and the ease of cleaning, make the coating particularly suitable for flooring applications.

As noted, the coating of the present invention has an inherent macroscopic texture. The term "macroscopic texture" is intended to encompass any textural features, regular or irregular, produced on the surface of a coating that are visible to the naked eye at close range, as opposed to microscopic texture that would require the use of a microscope to view the texture. The macroscopic texture of the present invention may also provide a non-smooth surface such that the texture is apparent to the touch. Additionally, the macroscopic texture when produced by the use of texture-producing particles may be visible to the naked or unaided eye at a close range. The macroscopic texture may have any design, shape, or pattern on the surface of the coating. This macroscopic texture (not shown in FIG. 1) is provided by the coating 12 and is visible to the naked eye when viewing the coating 12 on the coated substrate 10.

As described above in connection with the pre-cured coating mixture, the macroscopic texture may be provided by different components in the pre-cured coating mixture. In one embodiment of the invention, the macroscopic texture is provided by a pre-cured coating mixture having an effective viscosity capable of providing a macroscopic texture. In another embodiment, the macroscopic texture is provided by a pre-cured coating mixture that comprises texture-producing particles having an effective size to produce a cured coating with the macroscopic texture. In yet another embodiment, the macroscopic texture may be provided by a pre-cured coating mixture having both an effective viscosity and texture-producing particles. Several examples of various coatings made according to various embodiments of the present invention are described below, which provide examples of the various macroscopic textures. These examples are intended to provide examples of how a macroscopic texture may be achieved, but are not intended to be limiting as to the types, shapes, or patterns of macroscopic texture that may be obtained.

In addition, it was surprisingly found that the coatings of the present invention with macroscopic texture have superior scratch and abrasion resistance as measured by a Taber scratch test and traffic were panels. Scratch test results for various coatings made according to the present invention are described in the examples below.

It should be appreciated that the concentrations of the various non-reactive groups and components in the cured coating are assumed to be the same in the pre-cured coating mixture. As will be described below, the coating of the present invention is made by applying the pre-cured coating mixture to a substrate followed by either radiation-curing or thermal curing. Therefore, it is assumed that the concentrations of the various non-reactive groups and components in the pre-cured coating mixture will not change substantially during curing and will remain substantially the same. However, those skilled in the art will recognize that other factors, such as coating application processing conditions, may induce some degree of variability in these concentrations.

Figure 2:
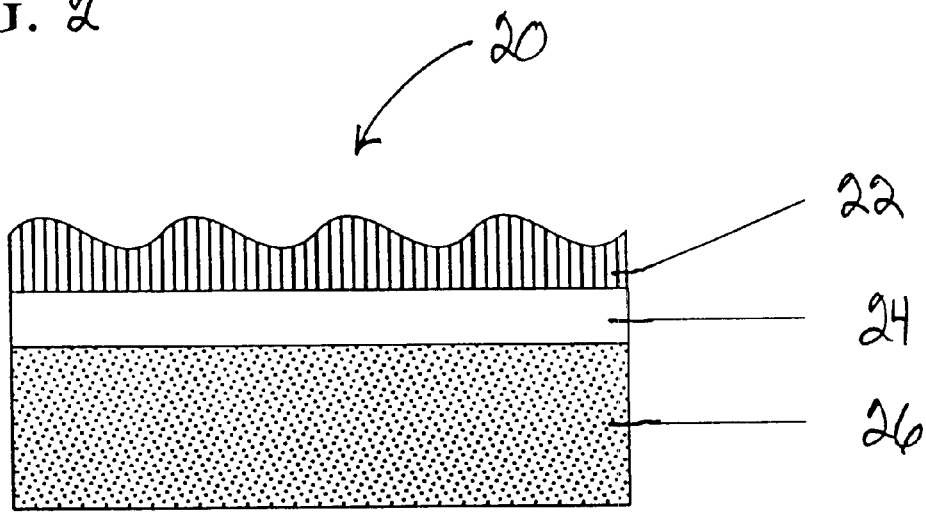
FIG. 2 illustrates a cross-sectional view of a coated substrate according to another embodiment of the present invention.

FIG. 2 illustrates a cross-sectional view of a coated substrate according to another embodiment of the present invention. FIG. 2 shows a coated substrate 20 having a coating 22 on a coated substrate layer 24 and additional substrate layers 26 attached to the coated substrate layer 22 on the side opposite the coating 22. The coating 22 illustrates the macroscopic texture provided by the coating 22. As shown in FIG. 2, it should be appreciated that the macroscopic texture of the coatings made according to the present invention is inherent in, or provided by, the coating itself and is independent of the substrate to which the coating is adhered. Therefore, it should be appreciated that this coating is significantly different from coatings that naturally conform to a substrate having a texture or for cured coatings that are impressed with a pattern.

Figure 3:
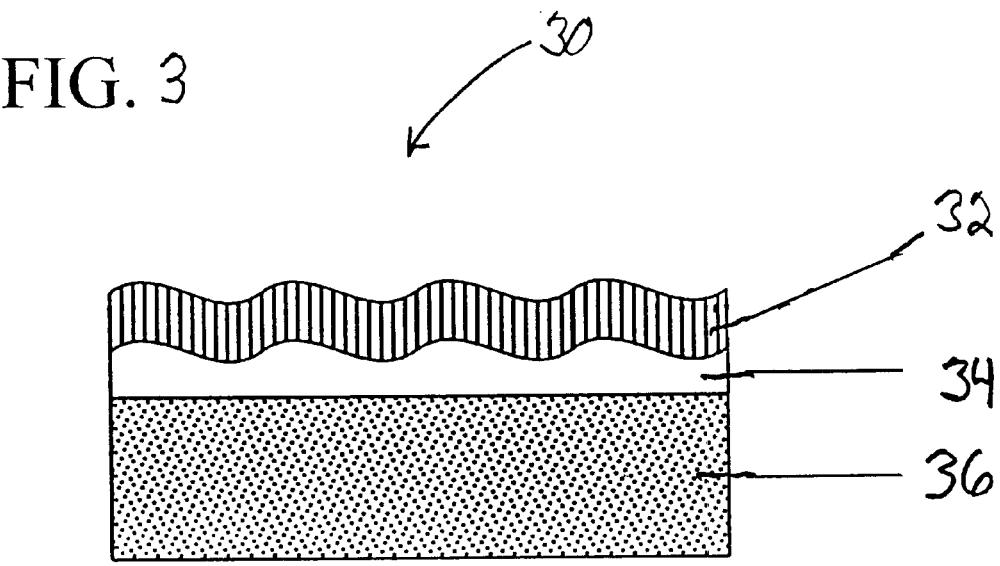
FIG. 3 illustrates a cross-sectional view of a coated substrate according to yet another embodiment of the present invention.

FIG. 3 illustrates a cross-sectional view of a coated substrate according to yet another embodiment of the present invention. FIG. 3 shows a coated substrate 30 having a coating 32 on a coated substrate layer 34 and additional substrate layers 36 attached to the coated substrate layer 32 on the side opposite the coating 32. FIG. 3 illustrates that the coatings of the present invention may also be applied to substrates that already have macroscopic texture themselves due to embossing or some other method. Thus, two or more textures can exist on a given coated substrate, i.e., texture from the coating and texture from the substrate. As illustrated in FIG. 3, the macroscopic texture of the coating 32 may be such that it conforms to the texture of the underlying substrate 34. Alternatively, the macroscopic texture may be applied so that it does not conform to the texture of the underlying substrate.

Figure 4:
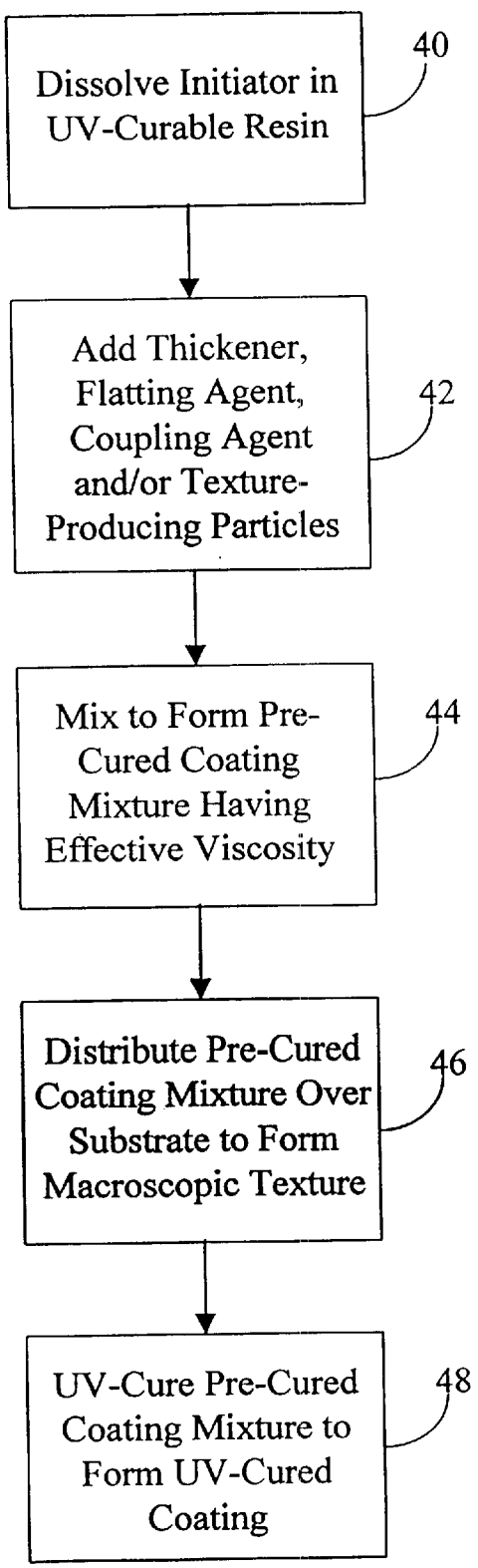
FIG. 4 is a process flow diagram of a process for making a coating according to one embodiment of the present invention.

FIG. 4 is a process flow diagram of a process for making a coating according to one embodiment of the present invention. In the step 40, the initiator is dissolved in the radiation-curable resin. The initiator and the resin may be mixed in any manner typically used in the art such that the initiator is dissolved into the resin phase.

In the step 42, any RCA, coupling agent, flatting agent, or texture-producing particles are added to the mixture produced in the step 40. It should be appreciated that for the RCA, flatting agent, and/or texture-producing particles, a coupling agent may also be used. In this case, the particles and the coupling agent may simply be added to the mixture either simultaneously or sequentially, without the need to pre-treat the particles with the coupling agent before adding these components to the mixture. This avoids the use of a solvent that may create diffusion pathways for staining materials to diffuse through and stain the coating. In some cases, it is desirable to make a concentrated mixture of RCA, coupling agent, flatting agent, and/or texture-producing particles in a liquid medium and dilute it down into the pre-cured coating mixture. This concentrate is called a master batch and is well known in the art.

In the step 44, all of the components are mixed to produce the pre-cured coating mixture. The step 44 may be accomplished using a Cowles blade mixer, ultrasonic probe, or other high shear mixer. It should be appreciated that during mixing the temperature of the mixture should not be allowed to increase significantly. For example, increases in temperature to approximately 100° C. may result in thermal reaction of the resin causing gelation. In cases where an organic solid is used as a RCA, the temperature during mixing should be allowed to increase to a temperature that is adequate to dissolve the organic solid, for example, 70° C. The temperature should then be reduced to ambient temperature, thereby producing a highly viscous pre-cured coating mixture.

In one embodiment of the invention, the pre-cured coating mixture produced in the step 44 must have the necessary viscosity to produce a macroscopic texture upon application and subsequent curing of the pre-cured coating mixture on a substrate. Preferably, the viscosity of the pre-cured coating mixture should be approximately 100,000–1,000,000 cPs at a shear rate of $0.150$ $s^{-1}$ at the application temperature. As will be further discussed below a viscosity that is too low does not provide a macroscopic texture, and a viscosity that is too high results in poor distribution of the pre-cured coating mixture over the substrate surface.

To obtain the requisite viscosity in the pre-cured coating mixture requires the use of the appropriate concentration of the radiation-curable resin. It should be appreciated that the radiation-curable resin may alone be used to provide the requisite viscosity, but that it may be desirable to use a RCA in conjunction with the radiation-curable resin to provide the requisite viscosity. If a RCA is used, then the requisite viscosity will be determined by using the appropriate concentration of both the radiation-curable resin and the RCA. It should be appreciated that in either case, the concentration of these components will be dependent upon the intrinsic properties of each. It should also be appreciated that the addition of other components, such as coupling agents and flatting agents, may also affect the viscosity of the pre-cured coating mixture. Therefore, these other components may also need to be considered in determining the appropriate concentrations of the radiation-curable resin and the RCA, if used.

In the step 46, the pre-cured coating mixture is distributed across the surface of a substrate. The step 46 requires that the pre-cured coating mixture is initially applied to the substrate surface and then distributed across the surface. Application of the pre-cured coating mixture to the surface of the substrate may be accomplished by any means known in the art for placing a high viscosity material onto a substrate. For example, the pre-cured coating mixture may be pumped to the substrate and placed on the substrate using a slot die. It should be appreciated that it may be necessary to heat the pre-cured coating mixture to reduce the viscosity to allow for its placement on the substrate surface; however, it is important that the pre-cured coating mixture be allowed to cool prior to actually distributing it across the substrate surface, so that it has the required viscosity necessary to generate macroscopic texture.

Distributing the pre-cured coating mixture across the substrate surface may be accomplished using any means known in the art; however, it is important that such means are capable of moving a high viscosity material across the surface in a manner that leaves the pre-cured coating mixture in the form of the desired macroscopic texture that will become fixed upon curing. It should be appreciated that it is preferred to uniformly distribute the pre-cured coating across the substrate surface, but such uniform distribution should not be confused with a completely smooth distribution of the pre-cured coating mixture across the substrate surface. After the pre-cured coating mixture has been distributed, the macroscopic texture should be apparent, as it is this texture that will be fixed on the substrate after curing. Therefore, it should be appreciated that, in addition to the use of an effective viscosity and/or texture-producing particles, the macroscopic texture can be altered using different techniques for applying the pre-cured coating mixture to a substrate.

Before discussing specific pre-cured coating application methods, it should be noted that the pre-cured coatings in this embodiment can have a viscosity that is dependent on both the amount of shear applied to the pre-cured coating mixture, as well as the amount of time during and after the application of the shear. This type of behavior is referred to in the art as thixotropic. Thus, the production of texture is dependent on the viscosity of the pre-cured coating under the shear of the application equipment.

One method for distributing the pre-cured coating mixture uniformly across the substrate surface in a manner that produces a desired macroscopic texture is by use of an air knife. The use of an air knife requires that the pre-cured coating mixture has been properly and uniformly applied to the substrate surface to allow the air knife to uniformly distribute the pre-cured coating mixture over the substrate surface. It should be appreciated that the relatively high viscosity of the pre-cured coating mixture at low shear rates allows the air knife to produce a macroscopic texture and prohibits a macroscopically smooth distribution of the pre-cured coating mixture. Thus, the pre-cured coating in this embodiment of the present invention has a high enough viscosity under the shear of the air knife to produce a macroscopic texture and not level into a macroscopically smooth surface. More specifically, the air knife actually generates a wave of pre-cured coating mixture that flows over the substrate surface as it passes by the air knife. This wave leaves behind a metered pre-cured coating with ripples that are the macroscopic texture.

It should be appreciated that the operating parameters of the air knife can be changed to produce varying macroscopic textures. These parameters include the line speed (dwell time under the air knife), air pressure, angle of attack, and the gap between the substrate and the air knife. Therefore, different macroscopic textures providing a variety of aesthetic looks may be produced.

It can now be appreciated that one method for determining whether the pre-cured coating mixture has the appropriate viscosity is by distributing the pre-cured coating mixture on the desired substrate using an air knife. If the viscosity of the pre-cured coating under the shear of the air knife is too low, the coating will level and produce a macroscopically smooth surface. If the viscosity under shear is too high, the pre-cured coating mixture will be blown off the substrate resulting in an incompletely or uncoated substrate.

Another method for distributing the pre-cured coating mixture uniformly across the substrate surface in a manner that produces a desired macroscopic texture is by use of a roll coater. The roll coater both applies and coats the pre-cured coating mixture to the substrate. The texture is generated by the roller being in direct contact with the coating on the substrate. As the substrate passes under the roller, the roller passes away from the substrate pulling or splitting some of the pre-cured coating from the substrate. This splitting results in macroscopic texture that can be varied with the roll coater operating parameters including line speed, gap between the roller and the substrate, roller material type (roller covering), engraving pattern on the roller, roller speed relative to the line speed and roller diameter.

In the step 48 the pre-cured coating mixture that has been distributed over the substrate surface and is in the form of the desired macroscopic texture is cured using radiation. This curing step acts to polymerize the pre-cured coating mixture to fix the macroscopic texture in place and adhere it to the substrate surface, thereby producing a radiation-cured coating on the substrate. The step 48 may be conducted under conditions typical of radiation-curing processes depending upon the particular radiation-curable resin and initiator used. For example, the step 48 may be conducted using radiation lamps in an inert atmosphere. It should be appreciated that if a matte finish is desired, the radiation lamps can be used in an ambient atmosphere followed by an inert atmosphere. Thus, a matte finish can be superimposed on the macroscopic texture if a flatting agent is used.

It should be appreciated that process steps described in connection with FIG. 4 are equally applicable to the use of a thermally-curable coating mixture made according to the present invention. In this case, the step 40 would be directed to a thermally-curable resin and a thermal initiator, and the step 48 would be directed to thermal curing and the formation of a thermally-cured coating.

In another embodiment of the invention, the pre-cured coating mixture utilizes texture-producing particles to produce the macroscopic texture of the coating. These texture-producing particles may be added to the pre-cured coating mixture in the step 42. These are mixed in the same manner as the previous embodiment, but the effective viscosity of the pre-cured coating can be much lower, typically 50–5000 cPs at a shear rate of 0.150 s$^{-1}$ at the application temperature, as the macroscopic texture is provided by the texture-producing particles and not necessarily by the viscosity of the pre-cured coating mixture. It should be appreciated, however, that these texture-producing particles can be used in combination with a pre-cured coating mixture that does have an effective viscosity as well. The pre-cured coating mixture containing these texture-producing particles is then processed in a similar manner using the steps 44, 46, and 48. Specifically, this pre-cured coating mixture can be mixed in a similar manner as described above in the step 44. This pre-cured coating mixture may be applied and coated on a substrate in the step 46 using methods known in the art, including the use of an air knife, roll coater, spray coating, curtain coating, and other coating application methods. Lastly, this pre-cured coating mixture may be cured in a similar manner as described above in the step 48.

It should be appreciated that the foregoing description of the methods used to generate the coatings of the present invention in the context of a radiation-cured coating is equally applicable to the generation of the thermally-cured coatings of the present invention.

Figure 4B:
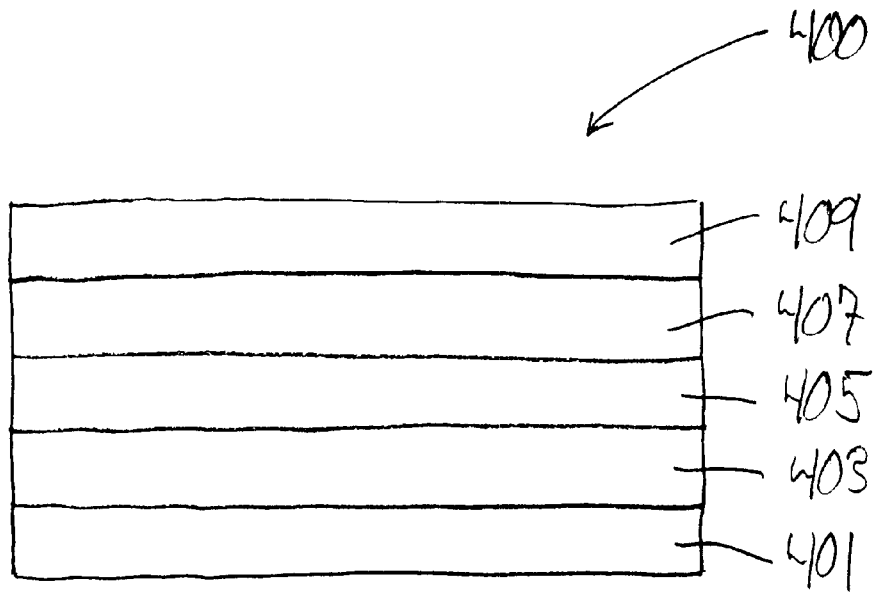
FIG. 4B illustrates a cross-sectional view of a coated substrate according to yet another embodiment of the present invention.

FIG. 4B illustrates a cross-sectional view of a coated substrate according to yet another embodiment of the present invention. In this embodiment, the coated substrate 400 is a sheet-style flooring material. This sheet flooring 400 comprises a bottom layer 401 made of felt or cellulose paper. On top of the bottom layer 401 is a gel layer 403, typically comprising a polyvinyl chloride plastisol, and on top of this gel layer 403 is a print layer 405 that may or may not comprise ink to provide a decorative pattern (not shown). On top of the print layer 405 is a clear wear layer 407 that is typically made of a polyvinyl chloride plastisol. On top of the wear layer 407 is a top coat 409, which may be any of the coatings of the present invention. A preferred construction of this sheet flooring comprises a felt layer of approximately 23.5 mils, a gel layer of approximately 57 mils, a print layer of nominal or relatively small thickness, a wear layer of approximately 20 mils, and a top coat of approximately 1–1.3 mils.

The basic sheet floor manufacturing process is well known in the industry. Generally, a felt backing is coated with a gel layer, typically a plastisol. This gel layer is then gelled to solidify it. A decorative print may then be applied to the top of this gel layer. The inks used in printing may be used in cooperation with the gel layer to inhibit a blowing agent that may be used in the gel layer to subsequently enable chemical embossing of the gel layer to provide additional aesthetics. Additionally, another plastisol-type layer may be applied on top of the print layer to provide protection for the decorative print or chemically embossed effects. This layer is typically referred to as a wear layer; however, a topcoat may also be used on top of the wear layer to protect it from scuffing or marring. This topcoat may be a thermal or radiation-curable coating according to any of the embodiments of the present invention.

In a preferred embodiment of the sheet floor manufacturing process, a 6 to 16 feet wide felt is coated with a liquid polyvinyl chloride (PVC) plastisol (e.g., PVC resin particles dispersed in plastisizers (e.g., phthalates)). Mixed into this liquid plastisol, which is called a gel layer, is a blowing agent (e.g., azodicarbonamide) and a catalyst (e.g., zinc oxide). The catalyst lowers the decomposition temperature of the azodicarbonamide and increases the amount of nitrogen gas produced by the azodicarbonamide decomposition. The liquid gel layer on felt is then gelled at a temperature below the decomposition temperature of the blowing agent (approximately 300° F.) to provide a solid non-foamed and smooth surface for printing. After the gel layer is solidified, it is printed with the desired design using water-based inks, thereby creating the print layer. In some of the inks, a compound that inhibits the decomposition of the blowing agent is present. After the ink is printed, the PVC-coated felt is wound up and allowed to age about 24 hours. This aging allows the inhibitor in the ink to diffuse into the gel layer, where it is believed that the inhibitor reduces the effectiveness of the catalyst.

The gel coated felt is then unwound on another production line where it is coated with another PVC plastisol that is formulated to be a clear layer when solidified. This liquid layer, called the wear layer since it protects the print from wearing, is then solidified (referred to as fused) at 385° F. for about 1.5 minutes. At this temperature, the azodicarbonamide blowing agent is activated in the gel layer resulting in the foaming of this layer which increases its thickness by forming a cell structure due to the gas formation. The ratio of the gel thickness before and after foaming is called the blow ratio, which is typically 2:1 to 4:1. In the areas of the gel directly below the ink containing inhibitor, less foaming occurs giving less of an increase in gel layer thickness. This process results in an embossing effect (i.e., chemical embossing). After the warm fused sheet leaves the oven it can be mechanically embossed for additional aesthetics.

While these PVC wear layers provide protection to the underlying print, they are susceptible to scuffing and marring due to the softness of the thermoplastic. To reduce the scuffing, these PVC surfaces can be either waxed or coated with a thermosetting coating (known as a "no wax coating") such as a radiation-curable coating (e.g., urethane acrylate) or thermally-curable coating made according to the present invention. If the flooring is to have a no wax finish, a radiation-curable or thermally-curable coating is then applied after the wear layer is cleaned with an acetic acid solution to remove dirt and oils. Excess coating is applied to the wear layer using a roller, where the roller transfers the coating from a trough to the wear layer surface. An air knife immediately meters the excess coating, where the excess is recycled back into the trough. As partially described in Example 19, the process conditions of the coating application and metering such as line speed (dwell time under the air knife), air knife pressure, angle of air knife relative to the web, gap between air knife and web, and the speed of the application roll relative to the line speed affect the coating texture. The uncured metered coating is then cured thermally or under UV lamps where both air and nitrogen atmospheres may be used for UV curing depending on the gloss of the coating desired.

The degree of texture of the radiation-curable or thermally-curable coating or top coat is dependent on the ratio of wet coating thickness to particle diameter. In using an air knife, the air knife pressure and the web (line) speed are the critical parameters for achieving texture. For example, low line speed and high air knife pressure result in a very thin coating due to increased metering. When the coating contains texture-producing particles, if the coating is too thin it can not hold the particles and a smooth non-textured coating results. If the line speed is high and the air knife pressure is low, the coating will be less metered and apply thick. If the coating is thicker than the texture-producing particles, the coating will be smooth. Thus, there is an optimum set of process conditions to get texture in production that can be determined based upon the particular pre-cured coating mixture used.

Referring back to FIG. 3 wherein the macroscopic texture may be provided by an underlying layer in the flooring material, one embodiment of the present invention is the use of texture producing particles in the wear layer of a flooring composition, such as that described in connection with FIG. 4B. In this embodiment, the texture is provided by the wear layer which may then be coated with a top coating that conforms to the underlying texture. By conforming to the underlying texture, the flooring composition will exhibit a macroscopic texture, such as a ceramic-like texture where the inherently textured coating layer is the PVC wear layer in this case. Alternatively, the top coating may be made according to the present invention to provide additional macroscopic texture to the flooring composition.

As noted above, the wear layer is constructed by applying PVC plastisols (dispersion of PVC particles in plastisizers) that have a viscosity of approximately 500–1600 cP to a printed surface (e.g., using knife over roll coating) at 10–30 mils in thickness. The plastisol is then gelled at high temperature (e.g., 300–400° F.) to form the solid, clear thermoplastic wear layer. In generating macroscopic texture with texture-producing particles in the wear layer, the following variables are important: (1) the type of application methods used (e.g., knife over roll coater), (2) the high viscosity of the plastisol (typically 500–1600 cP at room temperature), and (3) the thickness of the applied wear layer (10–30 mils). By comparison, using an air knife with the lower viscosity coating containing texture-producing particles as discussed in previous embodiments of the present invention allows the liquid coating to be metered around the texture-producing particles to generate the macroscopic texture. In addition, a radiation-curable or thermally-curable top coating with a lower viscosity (e.g., 50–250 cP) facilitates this metering, while the low application gauge (1–2 mils) allows fairly small particles (30–100 μm) to be used to provide texture in the coating. Therefore, to achieve texture with particles in a wear layer, specific application methods are needed to address each of these variables.

In using a knife over roll coater to apply PVC plastisols, the knife over roll coater mechanically sets the wet coating thickness, thus the texture-producing particles in the plastisol must be smaller than the wet film thickness or streaks will be generated. Thus, to use a knife over roll coater, texture-producing particles have to be added to the plastisol that are smaller than the wet film thickness, or the particles have to be added after the plastisol is coated. If the texture-producing particles are added to the plastisol before coating, these particles must either increase in size or change aspect ratio during gelation such that they protrude from the gelled wear layer to provide the macroscopic texture, or the wear layer must shrink during gelling to expose the particles.

With regard to swelling particles, U.S. Pat. No. 5,627,231 describes a process of adding particles to a wear layer that swell during gelation to give the wear layer a ceramic-like texture. The particles added to the plastisol absorb plasticizer during the gelling process and swell to give texture. However, the particles continue to absorb plasticizer and eventually become sticky. These sticky particles then attract dirt which quickly makes the floor dirty and hard to clean.

As such, an alternative would be to utilize shrinking wear layer. Example 22 provides an example of a wear layer composition that shrinks thereby allowing for greater exposure of the texture-producing particles and providing the macroscopic texture.

If the particles are to be added after knife over roll coating, the particles can simply be wet flocked on to the surface of the coated, wet plastisol, and then gelled. This ensures that (1) the particles are on the surface of the plastisol and, therefore, can be much smaller than the thickness of the wet plastisol, and (2) the particles do not interfere with the coating application method since they are sprinkled on the wet plastisol and then the excess particles removed (i.e., wet flocking) after the plastisol is applied. Example 23 demonstrates the use wet flocking.

To avoid the problem of mechanically setting the wet film thickness, a coating method such as air knife application can be used. However, in the present invention it is preferred to use plastisol viscosities that are much greater (500–1600 cP) than what is recommended for the air knife (<500 cP). When high viscosity plastisols containing texture-producing particles are applied by an air knife, the plastisol entraps the particles such that they are blown off the substrate leaving a smooth coating with no particles or texture. Thus, a standard plastisol must be modified to have a lower viscosity so that it can be metered around particles. An example of a plastisol with a low viscosity (200 cP) comprises by weight, 30.8% PVC resin (75HC available from Oxychem, Dallas, Tex.), 30.8% PVC resin (567 available from Oxychem, Dallas, Tex.), 28.4% plasticizer (N-6000 available from Velsicol, Rosemont, Ill.), 4.7% plasticizer (S-375 available from Solutia, St. Louis, Mo.), 2.0% plasticizer (A-150 available from Exxon, Houston, Tex.), and 3.3% stabilizer (2347 available from OMG, Cleveland, Ohio).

As described above, the coatings of the present invention may also be utilized in connection with floor tiles. The vinyl tile manufacturing process and tile construction for high-end "no wax" residential tiles are different from those of vinyl sheet floor and require specialized process and formulation changes to achieve macroscopically textured, radiation-cured or thermally-cured surface topcoats.

In general, tiles are manufactured by calendering and/or lamination processes. For example, a tile base comprising, for example, limestone, is made into a continuous sheet to which a printed design and a cap film, which is positioned on top of the printed design for protection, may be laminated. Optionally, a topcoat may then be applied to the cap film for additional wear protection. This topcoat may be a thermal or radiation-curable coating according to any of the embodiments of the present invention. It should be appreciated that the general process for constructing tiles can be used to make tiles of any thickness or size.

In a preferred tile manufacturing process, 9" by 9", 12" by 12", 14" by 14", 16" by 16", and 18" by 18" vinyl tiles are made by first mixing PVC resin, plasticizer, pigments, and a high level (~80%) of limestone (calcium carbonate) filler in a blender held at 115–135° F. The blended powder effluent is then transferred to a continuous mixer held at 320–340° F. for fusion (i.e. chain entanglement) of the limestone-filled resin into thermoplastic pieces of various sizes. The thermoplastic pieces are next sent to calendering roll operations for partial softening and re-fusion of the limestone-filled resin into the shape of a continuous sheet having an exiting temperature of 250–270° F. and a thickness of 50–200 mils. The continuous sheet of tile base is then carried via conveyor belt to a nip station for lamination of a printed design using either 2 mil thick printed PVC film or 0.5 mil thick printed transfer paper. The latter case involves transferring the ink of a printed design, originally on a paper roll, to the tile base at the lamination nip (the paper is subsequently removed with a re-wind operation immediately following the lamination nip).

Next, the continuous sheet of tile base and laminated print layer is conveyed to another nip for lamination of "cap film," which is an ~3 mil thick PVC film designed to protect the print layer. Both the cap film and print layer applications rely upon the nip pressure and incoming substrate temperature for lamination; the laminating rolls themselves are not heated. For floors requiring periodic waxing, the PVC cap film forms the uppermost layer of the manufactured tile construction (an end-user applied, sacrificial wax layer being the uppermost layer in practice). However, for "no-wax" floors, a thermosetting topcoat is applied to the top of the PVC cap film during manufacture and forms a surface with sufficient durability that the need for a sacrificial wax layer is eliminated. Nevertheless, and regardless of its final designation as a waxed or no-wax floor tile, the continuous sheet of laminated tile base, print layer, and cap film is then optionally mechanically embossed and finally punched into 9" by 9", 12" by 12", 14" by 14", 16" by 16", or 18" by 18" tiles using a metal die. The edge material not punched out of the continuous sheet by the die is recycled back into the tile base mixing process. The cut tiles themselves are conveyed to either a final processing and packaging station (for tiles requiring waxing in practice) or to the topcoat application operation (for no-wax tiles).

The traditional topcoat application process for no-wax tiles involves the deposition and metering of a liquid film of thermally-curable or radiation-curable resin onto the tile, followed by subsequent curing of the resin to form a durable thermoset topcoat. The traditionally preferred (but not exclusive) coating application method involves the use of a curtain coater to apply and meter ~3 mil of uncured UV-curable resin to the cap film surface of the tile. The coated, but uncured, tiles are then sent through a series of UV-processors containing UV lamps to induce cross-linking of the thermosetting resin, in the case where the coating is a radiation-curable coating. (Alternatively, the tiles would be heated to induce the cross-linking in the case where the coating is a thermally-curable coating.) Final processing of most no wax tile products involves an annealing process at 110–125° F. for up to two days to remove processing stresses and to ensure dimensional stability, as well as an edge grinding process to ensure that smooth edges are present for proper field installation. A thermosetting urethane backcoat is also applied with a roll-coater to balance the curling stresses imparted on the tile by the topcoat. The physical location of the backcoater and backcoat UV-processor is usually just prior to the topcoat operation (i.e., the backcoat is applied and cured first).

Figure 4C:
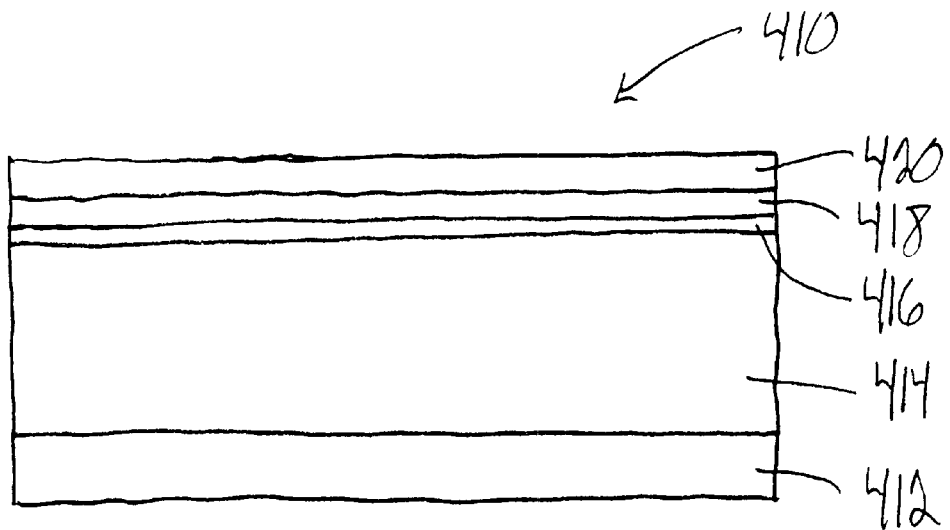
FIG. 4C is a cross-sectional view of a vinyl tile according to one embodiment of the present invention.

FIG. 4C is a cross-sectional view of a vinyl tile according to one embodiment of the present invention. The tile 410 generally comprises a backcoat 412, a tile base 414, a print film or alternatively a transfer print ink (not shown), a cap film 418, and a topcoat 420 having macroscopic texture (not shown). In a preferred embodiment, the backcoat 412 comprises a urethane backcoat of approximately 0.5–2 mils in thickness. The tile base 414 is approximately 50–200 mils in thickness, and the print film 416 is approximately 0.5 mils in thickness. The cap film 418 comprises a PVC cap film of approximately 2.8 mils in thickness, and the topcoat 420 comprises a urethane topcoat of approximately 1–3 mils in thickness having macroscopic texture.

The urethane topcoat 420 may alternatively be any of the coatings according to the present invention. As discussed generally above, the topcoat resin formulation generally contains mixtures of monomers and oligomers with acrylate functional groups to serve as the cross-linking centers, a photoinitiator or photoinitiator package to activate the cross-linking process under the UV-lamps, flatting agents for low-gloss finishes, and various mixtures of polyurethane, polyester, and polyether functional groups for imparting desired end-use performance into the cured topcoat. Moreover, the precise formulation of these ingredients is tailored to maximize performance on vinyl tile, where the rigidity of the tile substrate relative to vinyl sheet flooring makes scratch resistance more difficult to achieve and places less emphasis on flexibility. UV-coatings for the preferred tile topcoat process must also be formulated to adhere to the PVC cap film, which can require different ingredients than those used for adhesion of UV-topcoats to the PVC wear-layer in sheet floor, and the coating formulation may need to form a stable curtain in the curtain coater, since curtain coating is commonly used to apply non-textured coatings to floor tile. Lastly, the UV-processor conditions must be adjusted to produce the desired topcoat gloss (inert nitrogen atmospheres being preferred for high gloss, while a dual air, then nitrogen, curing environment is generally required for low gloss).

A preferred UV-curable coating formulation for use with tile substrates contains texture-generating nylon particles and alumina/silane rheological control agents. A more preferred pre-cured coating mixture comprises, by weight, 35.303% ethoxylated trimethylolpropane triacrylate (SR 454, available from Sartomer, Exton, Pa.), 41.050% polyester acrylate (LAROMER PE56F, available from BASF, Charlotte, N.C.), 5.747% urethane acrylate (ALUA 1001, available from Congoleum Corporation, Mercerville, N.J.), 0.330% acylphosphine oxide (LUCIRIN TPO, available from BASF, Charlotte, N.C.), 8.000% 3 micron inorganic flatting agent (ACEMATTE OK 412, available from Degussa Corp.), 2.323% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below, 1.000% inorganic RCA (NANOTEK ALUMINA #0100, available from Nanophase Technologies, Burr Ridge, Ill.), and 6.250% 60 micron texture-producing particle (ORGASOL 2002 ES6, available from Atofina, Philadelphia, Pa.). As such, a preferred cured coating according to the present invention is that coating produced using the above preferred pre-cured coating mixture.

Figure 4D:
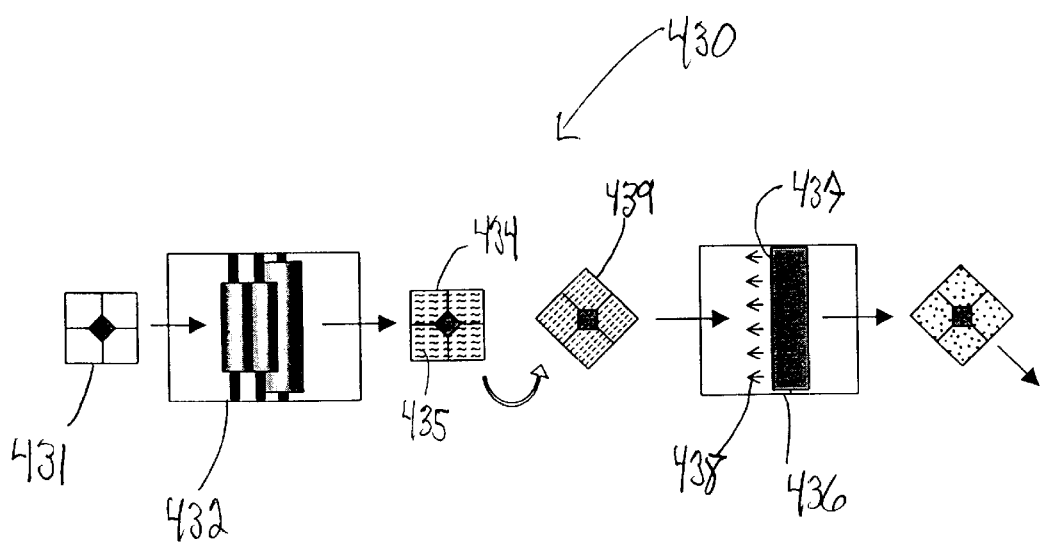
FIG. 4D is a process flow diagram of a process for applying a coating of the present invention to a tile substrate according to one embodiment of the present invention.

FIG. 4D is a process flow diagram of a process for applying a coating of the present invention to a tile substrate according to one embodiment of the present invention. In this embodiment, a radiation-curable thermosetting topcoat that provides macroscopic texture is applied to a vinyl tile substrate using a novel application method. This application method is called the Roll-coat and Air-Station (RAS) process, and is used in a preferred embodiment for application of pre-cured coating mixture to the cap film surface of a vinyl tile. The RAS process 430 first involves the use of a roll-coater 432 for application and metering of the uncured coating onto the tile substrate 431 in the form of a thin film having macroscopic, particle-generated texture. As described previously, the aggressiveness of the macroscopic texture is dependent upon the ratio of wet film thickness to particle diameter, and this ratio is determined primarily (although not necessarily exclusively) by this roll-coating step in the RAS process of the present invention. For a preferred three-roll coater, the horizontal metering and transfer gaps (nips) and the vertical application gap must be carefully optimized to apply the proper amount of coating for the generation of macroscopic particle-generated texture. If either or both of the gaps are too small, then the texture-generating particles cannot pass through the nips and are not applied to the tile substrate, which results in a smooth, non-textured coating. Conversely, if the gaps are too large, then the coating gauge is thicker than the particle diameter and a smooth, non-textured coating is again created (i.e., the particles are buried). Macroscopically textured coatings are generated in the present invention when the gaps are optimized for deposition of coatings having about the same or slightly less film thickness than the particle diameter (e.g., 1–2 mils of wet coatings containing 60 micron texture-generating particles).

However, the roll-coat process also imparts a directional distribution to the particle-generated textural features due to film-splitting between the roller and tile (see the Examples that describe film-splitting). This directionality is generally undesirable for field installation. Thus, subsequent passage of the textured, but directional, coated tiles 434 under an air knife 436 is then required to remove the roll-coat directionality and generate more desirable uniform and random macroscopic texture. Unlike traditional air knife coaters, the present invention uses air knife parameters of lip gap, gap to tile, line speed (dwell time under the air knife), and air pressure that are optimized primarily for the random redistribution of the roll-coat directionality in the uncured coating and not for metering of the coating off of the tile. Moreover, a vacuum conveyor is required to hold the tile on the conveyor belt during passage under the air knife. The assemblage of vacuum conveyor and air knife is hereafter termed the "air-station."

It was also found that the orientation of the roll-coat directionality relative to the airstream direction under the air knife greatly impacts the ability of the airstation to remove the roll-coat directionality. For example, if the tiles with uncured coating are sent under the air knife with the roll-coat directionality lines 435 parallel to the conveyor line direction (i.e., normal to the air knife slit direction and parallel to the airstream), then very little texture randomization occurs. However, if the tile 430 is rotated 90° relative to its orientation upon exiting the roll-coater (i.e., the roll-coat directionality lines 435 are parallel to the air knife slit 437 and normal to both the conveyor line direction and the air knife airstream 438), then the airstation can much more easily randomize the particle-generated texture. By readjusting the airstation parameters it was also possible to randomize the texture with a 45° tile rotation 439, which implies that simply mounting the air knife at 45° relative to the airstation conveyor will eliminate the need for actual rotation of the tiles in a continuous production process.

It should be appreciated that in the use of a roll-coating process, particularly with multiple rolls, it is desirable that the roll in contact with the substrate is a soft durometer roll to meter the coating mixture into the embossed areas or regions of the substrate, such as an embossed tile or sheet flooring or other embossed substrate. An example of this is described in Example 25.

It should be appreciated that the roll coating process and the air knife process may also be used separately for coating tiles. In addition, it should be appreciated that although the foregoing methods described for use in the manufacture of coated tiles, these methods may also be used in applying the pre-cured coating compositions of the present invention to sheet flooring as well. Specifically, the RAS process may be used for sheet flooring, other flooring substrates, and non-flooring substrates. Further, the roll coating process alone and spray coating alone may be used to coat tiles, sheet flooring, other flooring substrates, and non-flooring substrates.

Figure 4E:
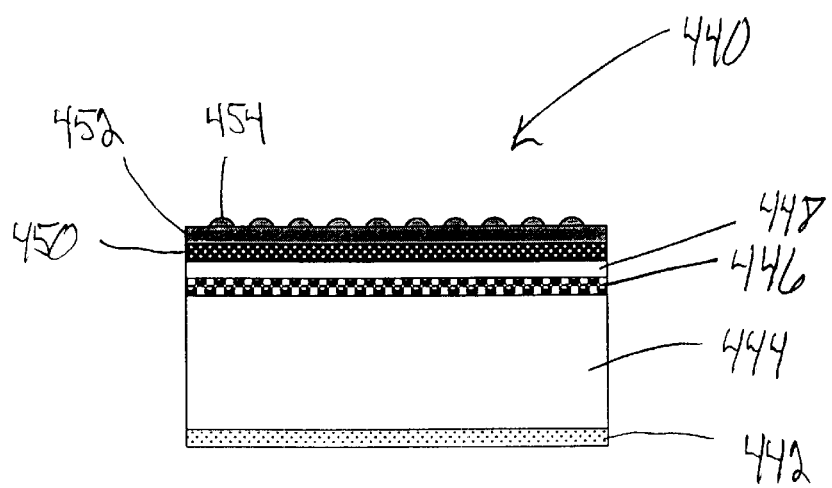
FIG. 4E illustrates a cross-sectional view of a coated substrate according to yet another embodiment of the present invention.

FIG. 4E shows a cross-sectional view of another embodiment of the present invention. The tile 440 generally comprises a backcoat 442, a tile base 444, a print film 446 or alternatively a transfer print ink (not shown), a cap film 448, an undercoat 450, and a topcoat 452 having macroscopic texture 454. It should be appreciated that the diagrammatic representation of the macroscopic texture 454 should not be deemed limiting and is simply used to represent the macroscopic texture. In a preferred embodiment, the backcoat 442 comprises a urethane backcoat of approximately 0.5–2 mils in thickness. The tile base 444 is approximately 50–200 mils in thickness, and the print film 446 is approximately 0.5 mils in thickness. The cap film 448 comprises a PVC cap film of approximately 2.8 mils in thickness, and the undercoat 450 comprises a radiation or thermally cured undercoat of approximately 1–3 mils in thickness. The topcoat 452 comprises a radiation or thermally cured topcoat of approximately 1–3 mils in thickness having macroscopic texture.

In this particular embodiment, there is a double layer of radiation-cured top coats, which provides improved scratch resistance. Such double-layer topcoats require a partial cure of the undercoat to give the undercoat sufficient structural integrity to withstand the RAS process used in application of the textured upper coat. However, if the undercoat approaches a fully cured state prior to application of the second, textured coating, then the textured upper coat will not properly adhere to the undercoat. Careful control of cure conditions during the partial cure of the undercoat is, therefore, required. After the textured upper coating has been applied on top of the partially cured undercoat via the RAS process, normal low or high gloss curing is then used to fully cure the entire double-layer topcoat system.

The invention having been described, the following examples illustrate various embodiments and features of the present invention. It should be appreciated that the following examples are presented to illustrate, rather than to limit, the scope of the invention.

EXAMPLE 1

This example describes a microscopic texture with good abrasion resistance, but poor cleanability. 60 g of alumina (available as NANOTEK ALUMINA 0100 from Nanophase Technologies Corp., Burr Ridge, Ill.) having an average particle diameter range of 27–56 nm, 7.92 g of prehydrolyzed 3-methacryloxypropyltrimethoxysilane (available as Z-6030 from Dow Corning, Midland, Mich.), 240 g of a UV-curable resin (see Table 1 below for the resin composition), and about 200 g of 0.5 in. diameter porcelain balls were added to a porcelain media mill.

The mixture was ball milled for about 6 hours at room temperature. The pre-cured coating mixture, after removal of the grinding media, was applied using a 1.5 mil draw bar to rigid polyvinyl chloride floor tile substrates at room temperature. The tile substrates were then UV-cured in a two step process. First, the tile substrates were UV-cured in air using a line speed of 100 feet per minute (fpm) under two H-bulb (mercury) lamps on high. Then the tile substrates were UV-cured in nitrogen (<500 ppm oxygen) using two H-bulbs set on low and a line speed of 20 fpm. The coated tiles were subjected to this latter inert UV-curing step a second time. The resulting coatings were transparent with an extremely low gloss of 6% (at 60°). Scanning Electron Microscopy (SEM) images of this coating indicate that microscopic wrinkling was present, i.e., micro-wrinkling. A Taber scratch test consisting of scribing 5 concentric circles on the coated samples with a metal stylus weighted from 300 to 500 g in 50 g increments yielded no visible scratches on the coating surface. A qualitative scratch rating system was used to evaluate the scratches from the test (i.e., a 0–7 scale was used, where 7 is the best in that there are no visible scratches), and this coating was rated 7. When this coating was exposed to heavy traffic areas, it picked up dirt particles quite easily and was very difficult to clean.

TABLE 1

UV-Curable Resin Composition

| Component | Manufacturer | Wt % |
|---|---|---|
| Urethane acrylate (ALUA 1001) | Congoleum (Mercerville, NJ) | 53.4 |
| Ethoxylated diacrylate (SR 259) | Sartomer (Exton, PA) | 8.8 |
| Propoxylated diacrylate (SR 306) | Sartomer (Exton, PA) | 24.3 |
| Ethoxylated trimethylolpropane triacrylate (SR 454) | Sartomer (Exton, PA) | 13.4 |
| Acylphosphine oxide (LUCIRIN TPO) | BASF (Charlotte, NC) | 0.1 |

As noted above, prehydrolyzed silane was used. The silane (Z-6030) was prehydrolyzed to make it more reactive with the surface of the nanometer-sized alumina. The prehydrolysis was conducted by first mixing at room temperature 5 g of glacial acetic acid, 5 g of deionized water, and 25 g of ethyl alcohol. Then, 75 g of Z-6030 were added to the mixture. The mixture was gently agitated for about 24 hours. The mixture was allowed to stand several days before use.

EXAMPLE 2

This example shows a coating with macroscopic texture having good cleanability and scratch resistance. 31.17 g of silica (available as NANOTEK SILICA 2000 from Nanophase Technologies Corp., Burr Ridge, Ill.) having an average particle diameter range of 15–33 nm, 10.51 g of prehydrolyzed 3-methacryloxypropyltrimethoxysilane (available as Z-6030 from Dow Corning, Midland, Mich.) prepared as described in Example 1, 100 g of a UV-curable resin (see Table 2 below for resin composition). The mixture was hand stirred with a wooden spatula and then mixed with an ultrasonic probe for about 20 minutes. The pre-cured coating mixture was applied to flexible polyvinyl chloride floor substrates at room temperature with a spatula and distributed on the substrate with an air knife. These sheet vinyl substrates were then UV-cured under nitrogen (<500 ppm oxygen) using two H-bulbs set on high and a line speed of 100 fpm. Two passes under the lamps were made under these conditions. The resulting coating was transparent with a gloss value (at 60°) of about 11%. The coating also had a macroscopic wave-like texture and was found to be cleanable. A Taber scratch test consisting of scribing 5 concentric circles on the coated samples with a metal stylus weighted from 300 to 500 g in 50 g increments yielded no visible scratches on the coating surface. Using the qualitative scratch rating system, this coating was rated a 7.

TABLE 2

UV-Curable Resin Composition

| Component | Manufacturer | Wt % |
|---|---|---|
| Urethane acrylate (ALUA 1001) | Congoleum (Mercerville, NJ) | 53.4 |
| Ethoxylated diacrylate (SR 259) | Sartomer (Exton, PA) | 8.8 |
| Propoxylated diacrylate (SR 306) | Sartomer (Exton, PA) | 24.2 |
| Ethoxylated trimethylolpropane triacrylate (SR 454) | Sartomer (Exton, PA) | 13.3 |
| Surfactant (DC 193) | DOW Corning (Midland, MI) | 0.1 |
| Acylphosphine oxide (LUCIRIN TPO) | BASF (Charlotte, NC) | 0.2 |

EXAMPLE 3

To show the benefits of using nanometer-sized alumina in a coating according to the present invention, a coating was made using larger alumina particles. 60 g of alumina (available as A152-SG from Alcoa, Pittsburgh, Pa.) having an average particle diameter of 1.5 μm, 0.48 g prehydrolyzed silane (Z-6030), 240 g of the resin used in Example 1, and about 200 g of 0.5 in. porcelain balls were added to a ball mill and milled as in Example 1. This pre-cured coating mixture was applied, cured, and tested for scratch resistance as given in Example 1. The resulting coating was visually not as transparent as the coating in Example 1 and was given a scratch rating of 2 indicating visual scratches were present.

EXAMPLE 4

Tests were conducted to determine the effects of silane as a coupling agent on the dispersion of nanometer-sized alumina. 2 g of NANOTEK ALUMINA 0100 having an average particle diameter range of 27–56 nm was added to 10 g of each of the following liquids: ethoxylated diacrylate (available as SR 259 from Sartomer, Exton, Pa.), propoxylated diacrylate (available as SR 306 from Sartomer, Exton, Pa.), ethoxylated trimethlolpropane triacrylate (available as SR 454 from Sartomer, Exton, Pa.), and urethane acrylate (available as ALUA 1001 from Congoleum, Mercerville, N.J.). The mixtures were stirred, shaken, and then placed into an ultrasonic bath for 30 minutes. To some of these mixtures 0.24 g prehydrolyzed silane, as prepared in Example 1, was added, and the mixture was stirred. The consistencies of each of these mixtures are described in the Table 3 below.

TABLE 3

Effects of Prehydrolyzed Silane

| Liquid | Dispersing Agent | Observations |
|---|---|---|
| SR 306 | none | thixotropic paste |
|  | silane | low viscosity liquid |
| SR 259 | none | low viscosity liquid |
|  | silane | low viscosity liquid |
| SR 454 | none | thixotropic paste |
|  | silane | low viscosity liquid |
| ALUA 1001 | none | non-thixotropic cream |
|  | silane | low viscosity liquid |

The observations show that the urethane acrylate and the Ethoxylated diacrylate disperse the nanometer-sized alumina better than the propoxylated diacrylate and the Ethoxylated trimethlolpropane triacrylate. These observations also show that the addition of the prehydrolyzed silane dispersing agent improves the dispersion of the nanometer-sized alumina.

EXAMPLE 5

This example shows the effects of alumina size and coupling agent on the clarity of the cured coating. The pre-cured coating mixture in Example 1 was prepared in the identical manner described with the following exception: the prehydrolyzed silane was prepared using 75 g of ethanol instead of 75 g of Z-6030 silane. Thus, this pre-cured coating mixture contained no coupling agent. This pre-cured coating mixture (referred to as Example 5), the pre-cured coating mixture in Example 1, and the pre-cured coating mixture in Example 3 were applied at room temperature using a 3 mil draw-down bar to glass substrates. The drawn down pre-cured coating mixtures were then cured using two curing conditions as described in Table 4.

TABLE 4

UV-Curing Conditions

| Condition | Parameters |
|---|---|
| 1 | atmosphere = air<br>line speed = 100 feet per minute (fpm)<br>lamp = 2 H-bulb (mercury) lamps on high<br>passes = 1<br>atmosphere = nitrogen (<500 ppm oxygen)<br>line speed = 20 fpm<br>lamp = 2 H-bulb lamps on low<br>passes = 2 |
| 2 | atmosphere = nitrogen<br>line speed = 20 fpm<br>lamp = 2 H-bulb lamps on low<br>passes = 2 |

The percent haze is defined as follows:

% haze=(100−% specular transmission)% total transmission and was determined for these cured coatings using a CHROMA SENSOR CS-5 from Applied Color Systems, Inc. and a method similar to ASTM D 1003-92. The thicknesses of the detached coatings were determined with a MADAKE micrometer. The haze and thickness values are given in Table 5 below.

TABLE 5

Coating Thickness and Haze Results

| Coating | Cure Conditions | Thickness (mil) | % Haze |
|---|---|---|---|
| Example 1 (20% nano-sized alumina) | 1 | 2.6 | 59.3 |
| Example 1 (20% nano-sized alumina) | 2 | 2.6 | 67.3 |
| Example 3 (20% micron-sized alumina) | 1 | 3.2 | 99.4 |
| Example 3 (20% micron-sized alumina) | 2 | 3.2 | 99.4 |
| Example 5 (20% nano-sized alumina, no silane) | 1 | 1.7 | 82.0 |
| Example 5 (20% nano-sized alumina, no silane) | 2 | 6.3 | 97.8 |

The percent haze values show that the coating with nanometer-sized alumina was much less hazy than the coating containing micron-sized alumina regardless of cure conditions. The data also show that the silane coupling agent improves the clarity of the coatings containing nanometer-sized alumina.

EXAMPLE 6

This example shows the effects of inorganic particle type and loading on the cured coating texture. Six pre-cured coating mixtures were prepared where the inorganic nano-particles and the prehydrolyzed silane (as described in Example 1) were added to the UV-curable organic phase used in Example 2. Each pre-cured coating mixture was mixed with a Cowles blade and then an ultrasonic probe. The composition of these pre-cured coating mixtures is shown in Table 6.

TABLE 6

Pre-Cured Coating Mixture Compositions

| Pre-Cured Coating Mixture | Nanometer-Sized Particle | Wt %/Vol % | Wt % Prehydrolyzed Silane | Photo-initiator (%) |
|---|---|---|---|---|
| 1 | None | 0/0 | 0 | 0.1 |
| 2 | $Al_2O_3$ | 19.5/6.0 | 1.8 | 0.1 |
| 3 | $Al_2O_3$ | 28.9/10 | 2.6 | 0.1 |
| 4 | $Al_2O_3$ | 40/15.4 | 3.6 | 0.2 |
| 5 | $SiO_2$ | 11/5.5 | 2.5 | 0.1 |
| 6 | $SiO_2$ | 16/8.3 | 3.7 | 0.2 |
| 7 | $SiO_2$ | 22/11.8 | 5.1 | 0.2 |

These pre-cured coating mixtures were then applied to flexible vinyl flooring substrates which were cleaned with a solution of acetic acid, soap, and water. The pre-cured coating mixtures were applied at room temperature using a pipette or a spatula depending on the viscosity, and then the samples were passed through an air knife to distribute the pre-cured coating mixture over the substrate and to remove any excess. The resultant films were then cured under UV lamps using different lamp intensities and atmospheres as described in Table 7 below. Scanning electron microscopy (SEM) images of the coatings were taken along with gloss measurements at 60°.

TABLE 7

Gloss and Texture Measurements

| Coating | Cure Conditions | Gloss (%) | Texture (SEM/visual) |
|---|---|---|---|
| 1 | $N_2$ - 100 fpm, 2 lamps high, 2 passes | 80 | smooth |
|  | Air - 100 fpm, 2 lamps high | 6 | long micro-wrinkles |
| 2 | $N_2$ - 100 fpm, 2 lamps high, 2 passes | 80 | smooth |
|  | Air - 100 fpm, 2 lamps high | 4 | short micro-wrinkles |
| 3 | $N_2$ - 100 fpm, 2 lamps high, 2 passes | 60 | some macro texture |
|  | Air - 100 fpm, 2 lamps high | 30 | very short micro-wrinkles |
| 4 | $N_2$ - 100 fpm, 2 lamp high, 2 passes | 30 | macro texture |
|  | Air - 100 fpm, 2 lamps high | 30 | macro texture |
| 5 | $N_2$ - 100 fpm, 2 lamp high, 2 passes | 20 | macro texture |
|  | Air - 100 fpm, 2 lamps high | 5 | macro texture and micro-wrinkles |
| 6 | $N_2$ - 100 fpm, 2 lamp high, 2 passes | 17 | macro texture |
|  | Air - 100 fpm, 2 lamps high | 16 | macro texture |
| 7 | $N_2$ - 100 fpm, 2 lamp high, 2 passes | 6 | macro texture |
|  | Air - 100 fpm, 2 lamps high | 6 | macro texture |
|  | $N_2$ - 100 fpm, 2 lamp 2 high, 2 passes |  |  |

Coatings cured under both air and inert atmospheres having 30% or less nanometer-sized alumina showed micro-sized wrinkles, which looked like spaghetti in the SEM images (200×). As the concentration of alumina is increased from 0 to 20%, the length of the wrinkles decreases under inert ($N_2$) curing conditions. At 30% alumina, the wrinkle length is quite small resulting in a surface resembling a golf ball surface in the SEM images. At 40% alumina, the micro-wrinkling is not observed in the SEM (surface is smooth), but a macro wave-like texture is observed with the naked eye. Wave-like macro texture is also observed with the coatings having 16% and 22% silica. In the cases where micro-wrinkling is not observed, the macro texture observed is independent of the cure conditions (two zone versus one zone) used.

EXAMPLE 7

This example demonstrates that wave-like macroscopic texture is generated by the coating application method. Pre-cured coating mixture 5 in Example 6 above was applied to a substrate with an air knife as in Example 6. The same pre-cured coating mixture was also applied to a second substrate with a 1.5 mil draw down bar. Both samples were cured in the inert atmosphere as described in Example 6. The sample coated with a draw bar had a visibly smooth surface and a gloss of 74% compared to a wave-like visible texture with a gloss of 20% for the sample coated with an air knife.

EXAMPLE 8

Figure 5:
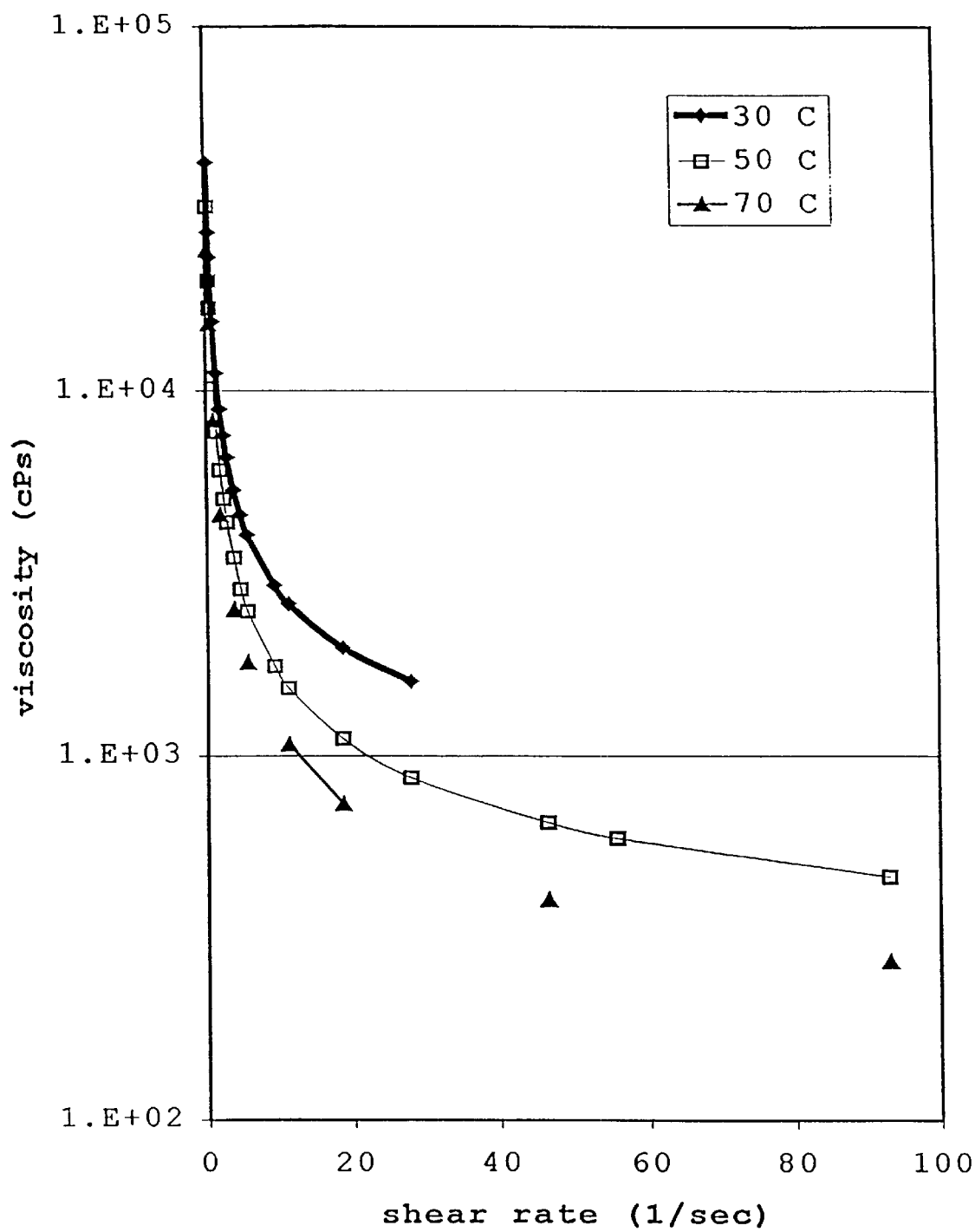
FIG. 5 is a graph of the viscosity as a function of the shear rate for a pre-cured coating mixture made according to one embodiment of the present invention.
Figure 6:
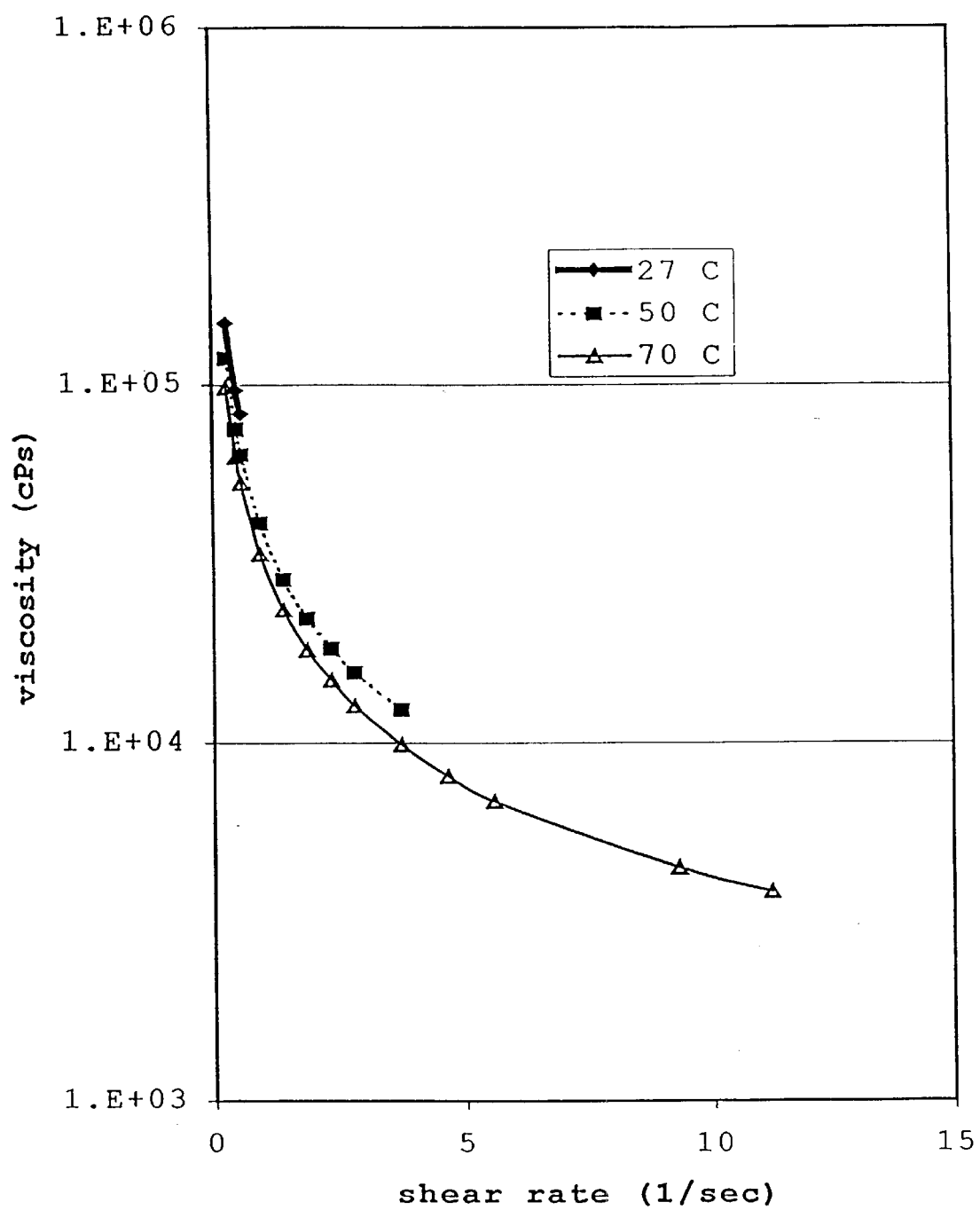
FIG. 6 is a graph of the viscosity as a function of the shear rate for a pre-cured coating mixture made according to another embodiment of the present invention.

This example shows the effect of shear rate and temperature on the pre-cured coating viscosity. The viscosities of pre-cured coating mixtures 3 (28.9% alumina) and 4 (40% alumina) from Example 6 were measured using a Brookfield viscometer (model DV-II, RV) with spindles 21 and 29 as a function of spindle rotation rate (related to shear rate) and temperature. FIG. 5 shows the results of these measurements for pre-cured coating mixture 3 and FIG. 6 shows the results for pre-cured coating mixture 4. The data show that the pre-cured coating mixture viscosity decreases with temperature and shear rate. The viscosity dependence with shear rate indicates that the actual viscosity of the pre-cured coating during application with an air knife is probably less than when measured at low shear ($0.150$ $s^{-1}$) by the Brookfield, since the shear rate under the air knife is assumed to be greater than $0.150$ $s^{-1}$. The viscosity dependence on temperature demonstrates the importance of keeping the pre-cured coating at the required temperature during application, since too high of a temperature may result in a coating that does not produce macroscopic texture because the viscosity is too low. The difference in the curves between FIGS. 5 and 6 show that the amount of RCA in the pre-cured coating influences the coating rheology, which could control the type and degree of texture in the cured coating.

EXAMPLE 9

This example shows the effects of pre-cured coating viscosity on cured coating texture. Using the pre-cured UV resin described in Table 2, 20%, 22.5%, 25%, 27.5%, and 30% nanometer sized alumina (as described in Example 1) was added and mixed with a Cowles blade mixer. Additionally 45% of nanometer-sized calcium carbonate was added to the resin described in Table 2 and mixed with a Cowles blade mixer. The viscosities of these pre-cured coatings were measured as described in Example 8 and are given in Table 8. These pre-cured coatings were then applied to flexible sheet vinyl substrates and coated with an air knife at room temperature. In the case of the coating with 45% calcium carbonate, the pre-cured coating simply blew off the substrate when the air knife was used. The samples were cured under inert conditions and tested for scratch resistance (Taber) and the gloss was determined. These data are also given in Table 8.

TABLE 8

Pre-Cured Coating Viscosity Effects on Cured Coating Properties

| Coating | Viscosity (cPs) at $0.150$ $s^{-1}$ at Room Temperature | Gloss (%) | Macroscopic Texture | Scratch (Taber) |
| --- | --- | --- | --- | --- |
| 20% alumina | 30,000 | 46 | none | some visible |
| 22.5% | 56,667 | 37 | very slight | some visible |
| 25% | 110,000 | 25 | yes | some visible |
| 27% | 173,000 | 19 | yes | some visible |
| 30% | 408,000 | 9 | yes, most aggressive | none visible |
| 45% calcium carbonate | 1,230,000 | n/a | n/a | n/a |

These data indicate that for the air knife conditions presently used, the viscosity of the coating needs to be approximately in the range of 100,000–1,000,000 cPs measured at room temperature (at a shear rate of $0.150^{-1}$) in order to generate macroscopic texture. The data also indicate that more aggressive texture yields better scratch resistance.

EXAMPLE 10

Figure 7:
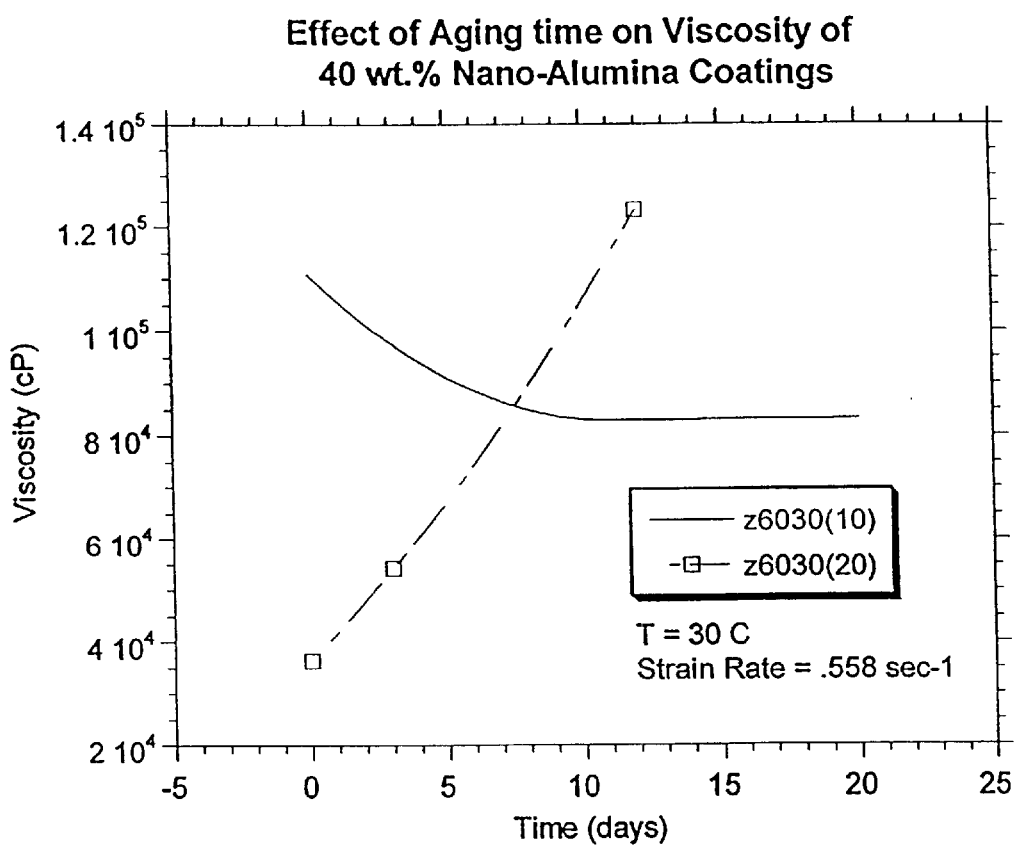
FIG. 7 is a graph of the viscosity as a function of time for a pre-cured coating mixture made according to one embodiment of the present invention.

This example shows the effect of aging and prehydrolyzed silane concentration on the pre-cured coating viscosity. The viscosity of pre-cured coating mixture 4 in Example 6 (40% alumina) was determined as a function of time. These results are shown in FIG. 7. The pre-cured coating mixture viscosity was found to have an aging effect in which fresh samples change viscosity over a period of about one week before leveling at a new viscosity. Specifically, pre-cured coating mixtures prepared with the optimal prehydrolyzed silane concentration (10 $\mu$mol/m$^2$) decrease about 25% in viscosity after 10 days and change color from a dark gray to a lighter gray, whereas pre-cured coating mixtures with 20 $\mu$mol/m$^2$ increase in viscosity by more than 4 times (i.e., the initial value was 75% lower than final value) in the same time period. This behavior suggests that at and below the optimal prehydrolyzed silane concentration the prehydrolyzed silane is continuing to further disperse the alumina particles as the prehydrolyzed silane molecules diffuse slowly to their final equilibrium locations on the particle surfaces and react with Al—OH groups. Conversely, when excess prehydrolyzed silane is present the equilibrium favors reagglomeration and crosslinking by prehydrolyzed silane condensation but is apparently kinetically limited prior to equilibration. Both processes seem to involve rather slow kinetic and/or diffusive steps and are unlikely to be affected much by additional mechanical mixing.

EXAMPLE 11

The effect on pre-cured coating viscosity of the concentration of prehydrolyzed silane coupling agent (as prepared in Example 1) was determined by measuring the viscosity as in Example 8 of a pre-cured coating mixture containing 40% nanometer-sized alumina (e.g., the pre-cured coating mixture 4 in Example 6 except the silane level was varied). The amount of prehydrolyzed silane used in all the examples was calculated using the following equation:

$$M_{ps} = (10^{-6} MW_{ps} a \, s_{np} m_{np})/C_{ps}$$

where $M_{ps}$ is the mass of prehydrolyzed Z-6030 (in g), a is the number of active sites on the nano-particle (in $\mu$mole/m$^2$), $MW_{ps}$ is the molecular weight of the prehydrolyzed Z-6030 (234 g/mol), $s_{np}$ is the nanometer-sized particle surface area (in m²/g), $m_{np}$ is the mass of nanometer-sized particles used in the formulation (in g), and $C_{ps}$ is the weight fraction of prehydrolyzed silane in the solution (from Example 1, typically 0.6818). Based on Parker et al., Mat. Res. Symp. Proc. 249 (1992) 273, 10 μm of active sites/m² of inorganic in all of the samples was used, because it should give the lowest pre-cured coating mixture viscosity and, hence, the best dispersion of the nanometer-sized particles. However, it should be appreciated that by controlling the amount of prehydrolyzed silane (more or less than 10 μmole/m²) can result in different shear dependent rheology, which in turn could lead to different textures.

Figure 8:
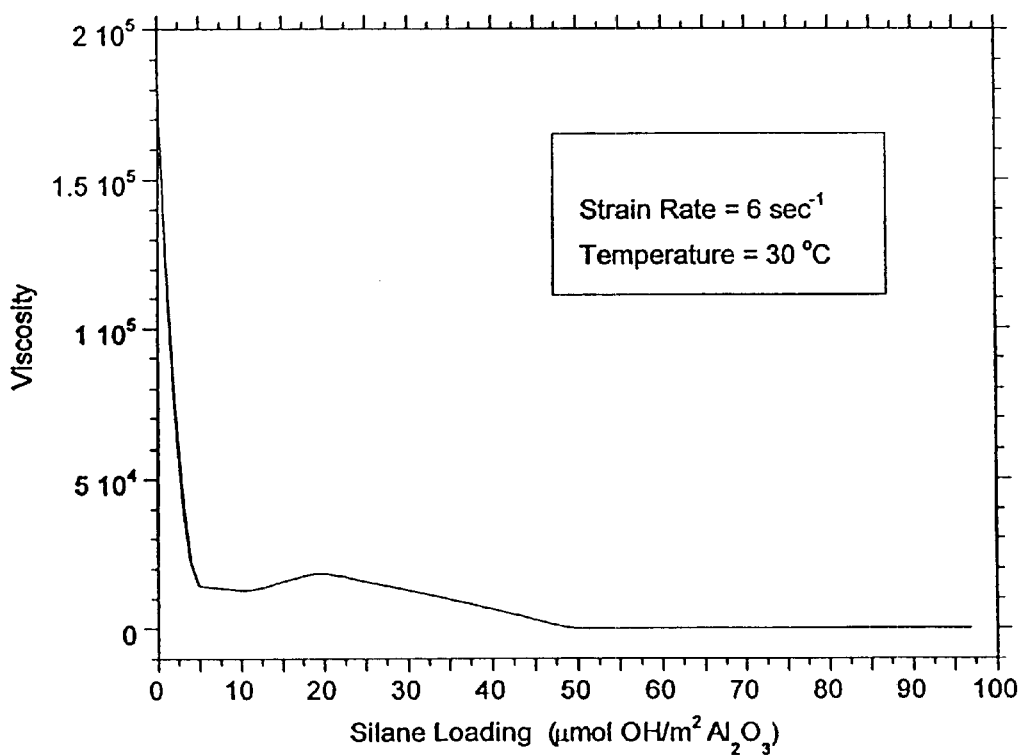
FIG. 8 is a graph of the viscosity as a function of the silane concentration in a pre-cured coating mixture made according to one embodiment of the present invention.

The pre-cured coating mixture viscosity was measured as a function of prehydrolyzed silane level (represented by the "a" value as described above) and the results are shown in FIG. 8. These data show that at a given strain rate, the pre-cured coating mixture equilibrium viscosity was found to initially decrease as the silane concentration was increased, presumably due to enhanced dispersion of the nanometer-sized particles in the resin phase. A viscosity minimum was reached at approximately 10 μmol silane/m² $Al_2O_3$ and serves as a measure of optimal dispersion for this surfactant-inorganic-resin mixture (in agreement with sedimentation results obtained by Parker et al. for the n-octyltriethoxysilane-toluene-5 μm $Al_2O_3$ system). The increase in viscosity observed at slightly higher silane concentrations corresponds to some reagglomeration of alumina particles as the excess silane forms larger organophobic phase domains (domains that include both the alumina particles and the hydrophilic ends of the silane molecules) that minimize surface energies between phases. Finally, viscosity again decreases at much higher silane concentrations due to simple mixing-rule behavior.

EXAMPLE 12

This example demonstrates the use of an organic RCA. 20 g of an organic (castor wax derivative) RCA THIXIN R (Rheox Inc., Hightstown, N.J.) was added to 480 g of the pre-cured UV resin described in Table 2 and mixed with a Cowles blade mixer. The mixture was then heated at 70° C. until the THIXCIN R dissolved. The mixture was then allowed to cool to room temperature. The viscosity of this mixture at a shear rate of 0.150 s$^{-1}$ at room temperature was 243,000 cPs. This mixture was then coated on flexible sheet vinyl using an air knife and cured under inert conditions. The resulting cured coating was transparent and had a wave-like macroscopic texture. When scratched using the Taber scratch test, no visible scratches were observed.

EXAMPLE 13

This example demonstrates the use of both an organic RCA and an inorganic flatting agent. 12 g of THIXCIN R organic RCA and 19.14 g of ACEMATTE OK 412 (Degussa Corp.) silica flatting agent were added to 288 g of the pre-cured UV resin described in Table 2 and mixed as in Example 12. This mixture was coated on a flexible vinyl sheet floor with an air knife and cured under both atmospheric and inert conditions. The resulting coating had a matte finish and wave-like texture.

EXAMPLE 14

This example shows that wave-like macroscopic texture can be generated without the use of an RCA. 85.25 g of Alua 2302 and 21.31 g ALUA 1001 urethane acrylate oligomers (Congoleum Corp., Mercerville, N.J.), 66.14 g of ACTILANE 424 and 26.64 g of ACTILANE 430 acrylate monomers (Akcros Chemicals, New Brunswick, N.J.), 0.2 g DC 193 surfactant, and 0.394 g of LUCIRIN TPO photoinitiator were added to a container at room temperature. This mixture was heated to 70° C. and mixed with a Cowles blade mixer. After cooling to room temperature, the pre-cured coating mixture was applied to flexible vinyl substrates, coated with an air knife, and UV-cured under inert conditions. The resulting coating was transparent and had macroscopic wave-like texture.

EXAMPLE 15

This example demonstrates the use of organic texture-producing particles and an inorganic flatting agent. 6.25 g of ORGASOL 2002 ES 6 NAT (Atofina, Philadelphia, Pa.) polyamide 12 texture-producing particle (60 μm in diameter) and 5.625 g of ACEMATTE OK 412 flatting agent (3 μm diameter) were added to 88.125 g of the pre-cured UV-resin described in Table 2 and mixed with a Cowles blade mixer. This mixture was heated to 70° C. and coated on a flexible sheet vinyl floor using an air knife. The pre-cured coating was cured at a line speed of 100 fpm using atmospheric and then inert conditions. The resulting coating was transparent coating with a matte finish and sandpaper-like texture.

EXAMPLE 16

Figures 9, 10:
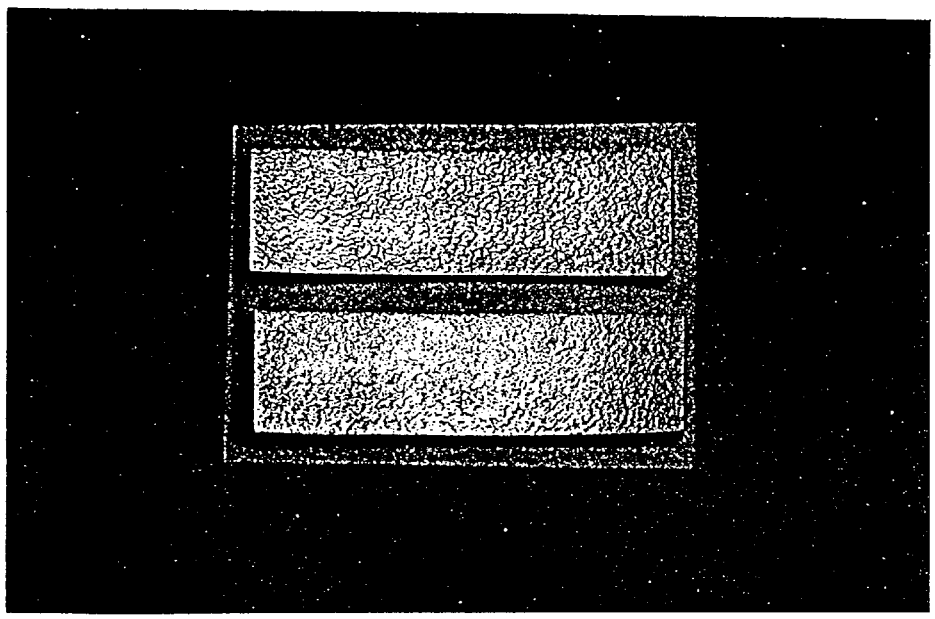
FIG. 9 is a photograph of the top of a portion of the coated substrate produced according to one embodiment of the present invention.
FIG. 10 is a photograph of the top of a portion of the coated substrate produced according to another embodiment of the present invention.
Figures 14, 15, 16, 17, 18:
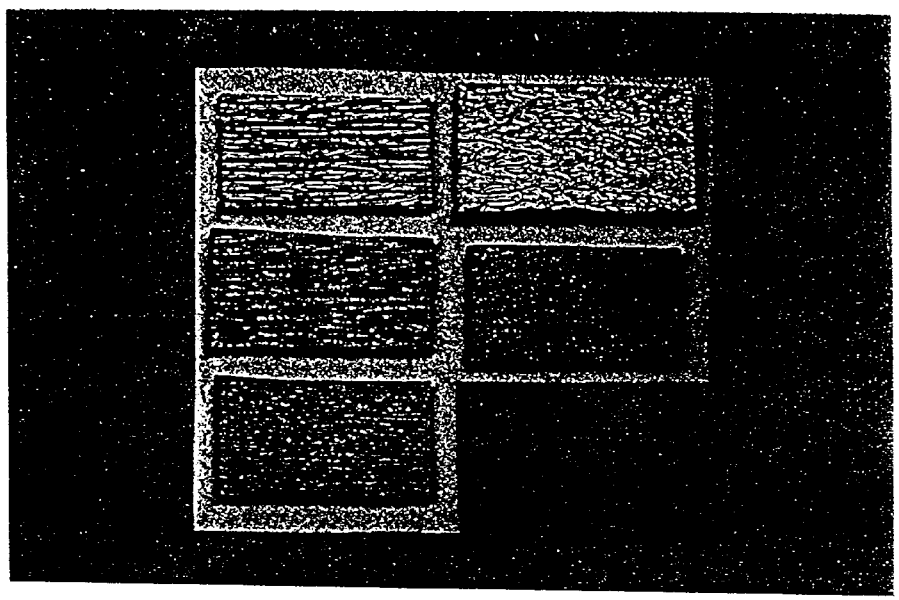
FIG. 14 is a photograph of the top of a portion of the coated substrate produced according to another embodiment of the present invention.
FIG. 15 is a photograph of the top of a portion of the coated substrate produced according to another embodiment of the present invention.
FIG. 16 is a photograph of the top of a portion of the coated substrate produced according to another embodiment of the present invention.
FIG. 17 is a photograph of the top of a portion of the coated substrate produced according to another embodiment of the present invention.
FIG. 18 is a photograph of the top of a portion of the coated substrate produced according to another embodiment of the present invention.
Figure 19:
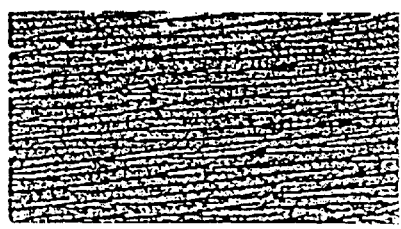
FIG. 19 is an illustration of the coated texture of FIG. 14.
Figure 20:
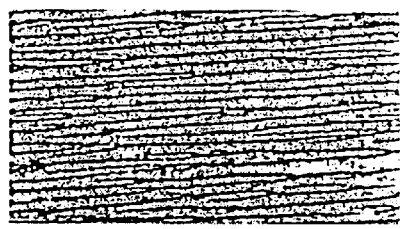
FIG. 20 is an illustration of the coated texture of FIG. 15.
Figure 21:
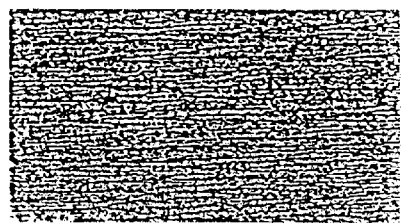
FIG. 21 is an illustration of the coated texture of FIG. 16.
Figure 22:
FIG. 22 is an illustration of the coated texture of FIG. 17.
Figure 23:
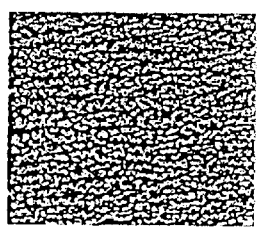
FIG. 23 is an illustration of the coated texture of FIG. 18.

This example shows the effects of the size of the texture-producing particles on the cured coating texture. Four pre-cured coating mixtures were prepared as in Example 15 where 6.25% of ORGASOL 2002 polyamide 12 texture-producing particles was added to the pre-cured UV-resin described in Table 2. The four mixtures differed in that each contained a different sized particle of ORGASOL 2002: 30 μm (grade ES 3), 40 μm (grade ES 4), 50 μm (grade ES 5), and 60 μm (grade ES 6). Each mixture was applied at 70° C. to sheet vinyl and coated with an air knife. All coatings were UV-cured under inert conditions. The cured coating containing the 30 μm particles had a visibly fairly smooth surface with a matte finish. The coatings with the larger particles had progressively more visible texture as the particle size increased, where the 60 μm particles gave the most visible and aggressive (largest textural features) texture. The scratch resistance of the coatings improved with increasing particle size, where 60 μm showed almost no visible scratches after the Taber scratch test. FIG. 9 is a photograph of the top of a portion of the coated substrate produced using the 60 μm particles, and FIG. 10 is a photograph of the top of a portion of the coated substrate produced using the 40 μm particles. The difference in the aggressiveness of the texture is evident. It should be appreciated, however, that the concentration of particles used would also be expected to have an influence on textural aggressiveness.

For illustrative purposes, "traces" of the surface textures of these samples were obtained by rubbing a soft graphite pencil over translucent tracing paper that was itself placed on top of the textured surfaces. The traces were then digitally scanned. FIG. 11 shows the texture of the coating producing using the 60 μm particles, and FIG. 12 shows the texture of the coating produced using the 40 μm particles. The traces clearly show the decrease in textural aggressiveness as nylon particle size is decreased from 60 μm as shown in FIG. 11 to 40 μm in FIG. 12.

These traces also allow for estimation of certain features of the texture. FIG. 13 is an illustration of the general type of macroscopic texture produced by the coatings in this Example 16. As shown, three parameters, a, b and c, are defined to describe certain planar features of the texture. These parameters are defined as follows: "a" represents the distance between peaks of the texture, "b" represents the width of each textural feature, and "c" represents the length of each textural feature. These parameters were measured manually from the corresponding traces and, therefore, may have substantial inherent error associated with them; however, they can be used to distinguish gross differences between the textures. Regardless, these parameters should not be viewed or used as limiting the type, shape, or size of the macroscopic texture. The ranges for these parameters for the coatings produced in this Example 16 are as follows: for the coating made with 60 µm particles a ranges from 10–50 mils, b ranges from 5–30 mils, and c ranges from 100–350 mils, for the coating made with 40 µm particles a ranges from 5–30 mils, b ranges from 1–20 mils, and c ranges from 10–150 mils, and for the coating made with 30 µm particles a ranges from 5–20 mils, b ranges from 1–10 mils and c ranges from 1–50 mils.

The average gloss values (60°) and the textural relief values (defined as maximum coating thickness minus minimum coating thickness) were also measured for the coatings produced by this Example 16. The gloss values are 10.8, 16.9, and 35.3 for the coatings made with 60 µm, 40 µm, and 30 µm particles, respectively. The textural relief values are 1.99 mils, 0.52 mils, and 0.29 mils for the coatings made with 60 µm, 40 µm, and 30 µm particles, respectively.

EXAMPLE 17

This example describes textured coatings containing organic texture-producing particles, an inorganic RCA with a coupling agent, and both organic and inorganic flatting agents. Per-cured coating mixtures having the composition shown in Table 9 were mixed with a Cowles blade mixer.

TABLE 9

Pre-Cured Coating Mixture Compositions in Weight Percent

| Component | Coating A | Coating B |
|---|---|---|
| UV-Curable Resin from Table 2 | 85.62 | 85.95 |
| ORGASOL 2002 ES 6 (60 µm texture-producing particle) | 6.12 | 6.25 |
| ORGASOL 2001 UD (5 µm organic flatting agent) | 6.0 | 0 |
| ACEMATTE OK 412 (3 µm inorganic flatting agent) | 0 | 5.49 |
| NANOTEK ALUMINA (inorganic RCA) | 1.96 | 2 |
| Prehydrolyzed Z-6030 (coupling agent from Example 1) | 0.30 | 0.31 |

Both coatings were applied to flexible sheet vinyl at 70° C. and coated with an air knife. These coated substrates were UV-cured under atmospheric and then inert environments. The resulting cured coatings were transparent and had sandpaper-like macroscopic texture and matte finishes.

EXAMPLE 18

This example demonstrates the use of a roll coater application method for generating and controlling macroscopic texture similar to that of wood-grain. Three pre-cured coating mixtures were used, including the coating of Example 9 (30% nano-alumina inorganic RCA), the coating of Example 12 (organic RCA), and the coating of Example 16 (60 µm texture-generating nylon particles). These pre-cured coating mixtures were then applied to cleaned, semi-rigid vinyl tile flooring substrates using a pipette or spatula as described in Example 6. Distribution of the pre-cured coating mixture to a macroscopically textured state and removal of excess coating was then achieved by passing the samples under a contacting roller using the process conditions listed in Table 10. Specifically, Table 10 gives the conditions for the contacting roll, which actually makes contact with and the pre-cured coating to provide macroscopic texture. More specifically, the contacting roll acts to split the pre-cured coating mixture that has been applied to the substrate between the contacting roll and the substrate and is referred to as "film-splitting," where "film" refers to the pre-cured coating mixture as applied to the substrate. This film-splitting phenomenon acts to form the macroscopic texture of the coating on the substrate. The gap indicated is between the contacting roll and the uncoated substrate surface when the uncoated substrate is between the rolls (i.e., total gap minus substrate thickness). Also, in the case where the contacting roll is rotating, the rotation is away from the surface of the sample. In all cases, the lower roll carried the samples between the rolls at 100 fpm and, upon exiting the roll coater, the pre-cured coated samples were cured under an inert ($N_2$) environment at 100 fpm.

TABLE 10

Roll Coated Sample Compositions and Process Conditions

| Sample and Figure Identification | Coating | Process Conditions |
|---|---|---|
| 1 (FIGS. 15 and 19) | Organic RCA Coating of Example 12 | Hard rubber roll (stationary) Gap = 4.0 mils |
| 2 (FIGS. 14 and 20) | Inorganic RCA Coating of Example 9 | Hard rubber roll (stationary) Gap = 4.0 mils |
| 3 (FIGS. 16 and 21) | Organic RCA Coating of Example 12 | Hard rubber roll (stationary) Gap = −10 mils (compressed) |
| 4 (FIGS. 17 and 22) | Inorganic RCA Coating of Example 9 | Soft rubber roll (rotating 100 fpm) Gap = 0.0 mils |
| 5 (FIGS. 18 and 23) | Texture-Generating Particles Coating of Example 16 | Hard rubber roll (stationary) Gap = 18 mils |

FIGS. 14–18 are photographs of the top of a portion of each coated substrate made using coatings 1–5 listed in Table 10. FIGS. 19–23 are traces, made as described in Example 16, of the surface textures of these coated substrates having coatings 1–5 listed in Table 10. Gloss (60°) and gauge (thickness) measurements are given in Table 11, where textural relief is calculated as the maximum gauge minus the minimum gauge (in mils). Note that the gloss is reported for both the in-line direction (i.e., the direction that the sample traveled while passing through the roll coater) and for the transverse direction. Gauge measurements were made using a light microscope equipped with a microscale and involved viewing cross-sections of the cured samples cut in the transverse direction.

Figure 24:
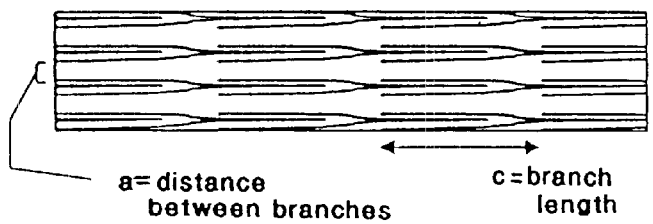
FIG. 24 is an illustration of the general type of macroscopic texture according to another embodiment of the present invention.
Figure 25:
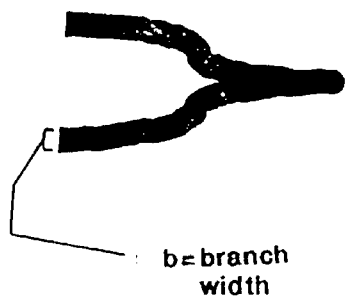
FIG. 25 is an enlarged view of a portion of FIG. 24.

FIG. 24 illustrates the general type of macroscopic texture produced by the coatings in this Example 18, and FIG. 25 is an enlarged view of a portion of FIG. 24. As shown, the texture produced in this Example 18 can be described as "branched". FIGS. 24 and 25 show three parameters, a, b and c, that are defined to describe certain planar features of the texture. These parameters are defined as follows: "a" represents the distance between branches of the texture, "b" represents the width of each branch, and "c" represents the length of each branch. These parameters were measured manually from the traces for each of the coatings shown in FIGS. 19–23 and, therefore, may have substantial inherent error associated with them; however, they can be used to distinguish gross differences between the textures. Regardless, these parameters should not be viewed or used as limiting the type, shape, or size of the macroscopic texture. The ranges for these parameters for the coatings produced in this Example 18 are provided in Table 11.

TABLE 11

Gloss and Texture Measurements of Roll Coated Samples

| Sample | Gloss (60°) In-line | Gloss (60°) Trans. | Gauge (mils) Min | Gauge (mils) Max | Relief (mils) | Range of Planar Dimensions (mils) a | b | c |
|---|---|---|---|---|---|---|---|---|
| 1 | 50.2 | 15.5 | 1.20 | 2.44 | 1.24 | 40–100 | 10–20 | 100–1500 |
| 2 | 69.3 | 21.2 | 1.35 | 2.34 | 0.99 | 40–100 | 10–20 | 100–1700 |
| 3 | 65.8 | 29.2 | 0.69 | 1.11 | 0.42 | 20–30 | 5–10 | 100–1000 |
| 4 | 32.1 | 16.4 | 1.08 | 2.69 | 1.61 | 40–70 | 10–20 | 100–200 |
| 5 | 27.6 | 17.4 | 0.79 | 1.71 | 0.92 | 40–70 | 20–40 | 300–500 |

These results show that a range of texture similar to that of wood-grain may be achieved by adjustment of process conditions during the roll coating application of the pre-cured coating mixtures. Key parameters appear to be the rotational speed of the contacting roll that directly contacts the pre-cured coating, the gap between the contacting roll and the sample, and the hardness of the contacting roll.

If the contacting roll is moving in the line direction, then the pre-cured coating film is split quickly as the moving roll pulls a fraction of the coating away from the coated substrate. This results in very short textural branches (see, for example, FIG. 18). Conversely, a stationary contacting roll does not split the film as rapidly, allowing the branches to extend to much longer lengths before a fraction of the branching film detaches from the substrate and ends the branch. This macroscopic texture is best described as "wood-grain" in nature. Moreover, the wood-grain texture may be further controlled by adjusting the gap. A smaller gap yields a more finely scaled wood-grain texture (e.g., compare FIGS. 19 and 21). The use of texture-producing particles in a roll-coated pre-cured coating mixture produces a hybrid macroscopic texture that contains both wood-grain and "sandpaper-like" textural elements (see, for example, FIGS. 18 and 23). The hardness of the contacting roll is also expected to affect the film splitting behavior of the roll-coating application method, as are intrinsic pre-cured coating properties such as viscosity and particle density.

EXAMPLE 19

This example illustrates how the manipulation of process conditions may be used to control the aggressiveness of macroscopic texture generated by an air knife coating application method. Two pre-cured coating mixtures were used, the first being the coating of Example 9 (30% nano-alumina inorganic RCA). The second pre-cured coating consisted of the coating composition given in Example 15, with the exception that the organic texture-generating particles were 40 μm polypropylene particles added at 5 wt. % (PROPYLTEX 200S available from Micro Powders, Inc., Tarrytown, N.Y.) instead of the 6.25 wt. % nylon particles. These pre-cured coating mixtures were applied to flexible sheet vinyl floor with an air knife using the process conditions indicated in Table 12. The pre-cured coated samples were then cured under an inert ($N_2$) environment at 100 fpm.

TABLE 12

Air Knife Coater Sample Compositions and Process Conditions

| Sample and Figure Identification | Line Speed | Air Knife Pressure |
|---|---|---|
| Inorganic RCA Coating | | |
| 1 (FIGS. 26 and 29) | 100 | 4.0 |
| 2 (FIGS. 27 and 30) | 50 | 4.0 |
| 3 (FIGS. 28 and 31) | 10 | 4.0 |
| Particle Coating | | |
| 4 | 100 | 4.0 |
| 5 | 10 | 4.0 |
| 6 | 100 | 1.5 |
| 7 | 10 | 1.5 |

Figures 26, 27, 28:
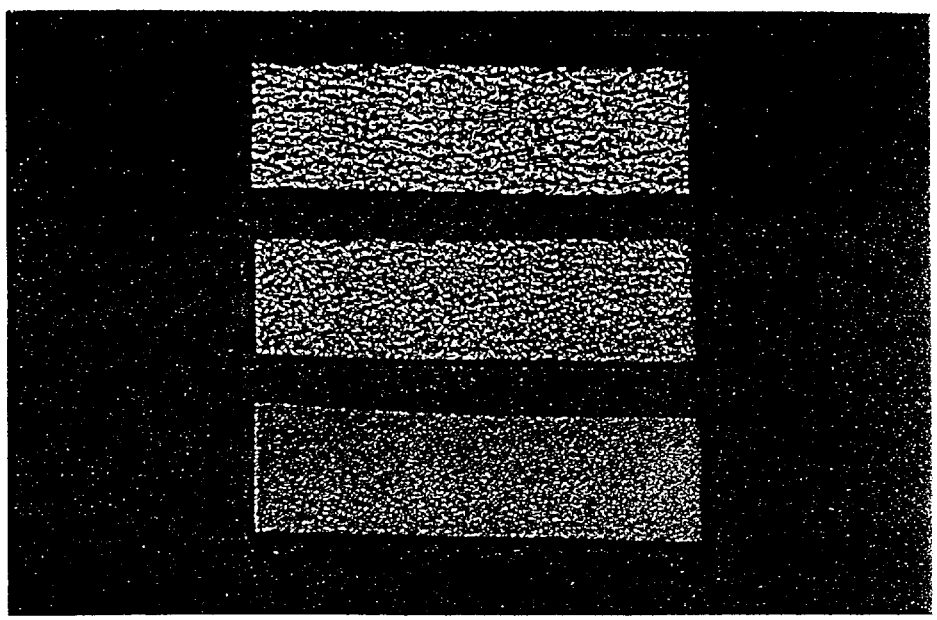
FIG. 26 is a photograph of the top of a portion of the coated substrate produced according to another embodiment of the present invention.
FIG. 27 is a photograph of the top of a portion of the coated substrate produced according to another embodiment of the present invention.
FIG. 28 is a photograph of the top of a portion of the coated substrate produced according to another embodiment of the present invention.
Figure 29:
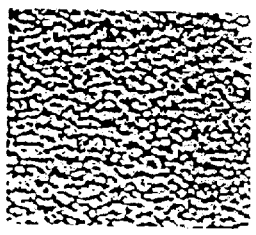
FIG. 29 is an illustration of the coated texture of FIG. 26.
Figure 30:
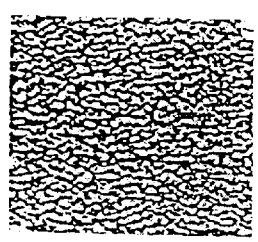
FIG. 30 is an illustration of the coated texture of FIG. 27.
Figure 31:
FIG. 31 is an illustration of the coated texture of FIG. 28.

FIGS. 26–28 are photographs of the top of a portion of each coated substrate made using coatings 1–3 listed in Table 12, respectively. FIGS. 29–31 are traces, made as described in Example 16, of the surface textures of these coated substrates having coatings 1–3 listed in Table 12, respectively. These figures show that the macroscopic texture produced using the inorganic RCA are wave-like. Traces of the particle textures for samples 4–7 in Table 12 were not made, but traces of similar particle-generated "sandpaper" macroscopic texture can be found in Example 16.

Figure 32:
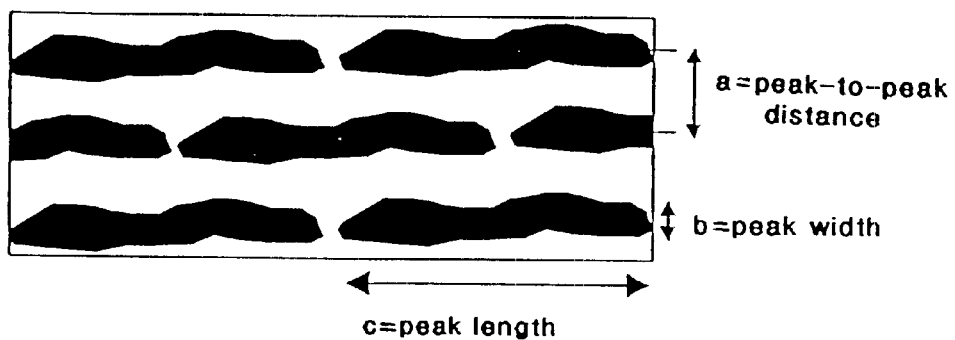
FIG. 32 is an illustration of the general type of macroscopic texture according to another embodiment of the present invention.

FIG. 32 is an illustration of the general type of wave-like macroscopic texture produced by the coatings in this Example 19. As shown, three parameters, a, b and c, are defined to describe certain planar features of the texture. These parameters are defined as follows: "a" represents the distance between peaks of the texture, "b" represents the width of each textural feature, and "c" represents the length of each textural feature. These parameters were measured manually from the corresponding traces and, therefore, may have substantial inherent error associated with them; however, they can be used to distinguish gross differences between the textures. Regardless, these parameters should not be viewed or used as limiting the type, shape, or size of the macroscopic texture. The ranges for these parameters for the coatings produced in this Example 19 are provided in Table 13. Gloss (60°) and gauge (thickness) measurements are also given in Table 13 and follow the same conventions as the gloss and gauge data presented in Example 18.

TABLE 13

Gloss and Texture Measurements for Air Knife Coated Samples

| Sample | Gloss (60°) In-line | Gloss (60°) Trans. | Gauge (mils) Min | Gauge (mils) Max | Relief (mils) | Range of Planar Dimensions (mils) a | b | c |
|---|---|---|---|---|---|---|---|---|
| 1 | 20.0 | 29.6 | 2.62 | 4.24 | 1.62 | 50–100 | 20–50 | 20–350 |
| 2 | 17.6 | 21.6 | 1.68 | 3.31 | 1.63 | 20–70 | 10–20 | 10–400 |
| 3 | 23.3 | 30.5 | 0.66 | 1.06 | 0.40 | 10–20 | 5–10 | 20–100 |
| 4 | 62.4 | 58.0 | 0.97 | 1.44 | 0.47 | | | |
| 5 | 37.4 | 36.0 | 0.45 | 0.85 | 0.40 | | | |
| 6 | 74.9 | 75.3 | 2.62 | 2.62 | 0.00 | | | |
| 7 | 16.9 | 17.1 | 0.61 | 1.61 | 1.00 | | | |

These results show that it is possible to control the aggressiveness of macroscopic textures generated with an air knife by adjusting the process conditions. For the high viscosity coating that employs an RCA as part of its composition, the wave-like macroscopic textures progress from relatively large and broad features at fast line speeds to texture with a very fine, satin finish at low line speeds. Note that even in the latter case (FIGS. 28 and 31) the fine wave-like features can still be distinguished with the unaided eye. Also note that the same pre-cured coating composition was used in samples 1–3, illustrating the appreciable textural control that may be attained from the coating application method alone.

Similar textural control is achieved using a coating with texture-producing particles ("sandpaper" texture), as indicated by the large variations in gloss and relief shown in Table 13 for samples 4–7 (similarly, a single pre-cured coating composition was used in samples 4–7). In general, lower gloss and higher relief correspond to more aggressive textures. However, variations in the planar dimensions and in the average gauge (average of the minimum and maximum gauges) are also important for the overall perceived aggressiveness of the textures (and may also influence gloss readings).

EXAMPLE 20

Figure 33:
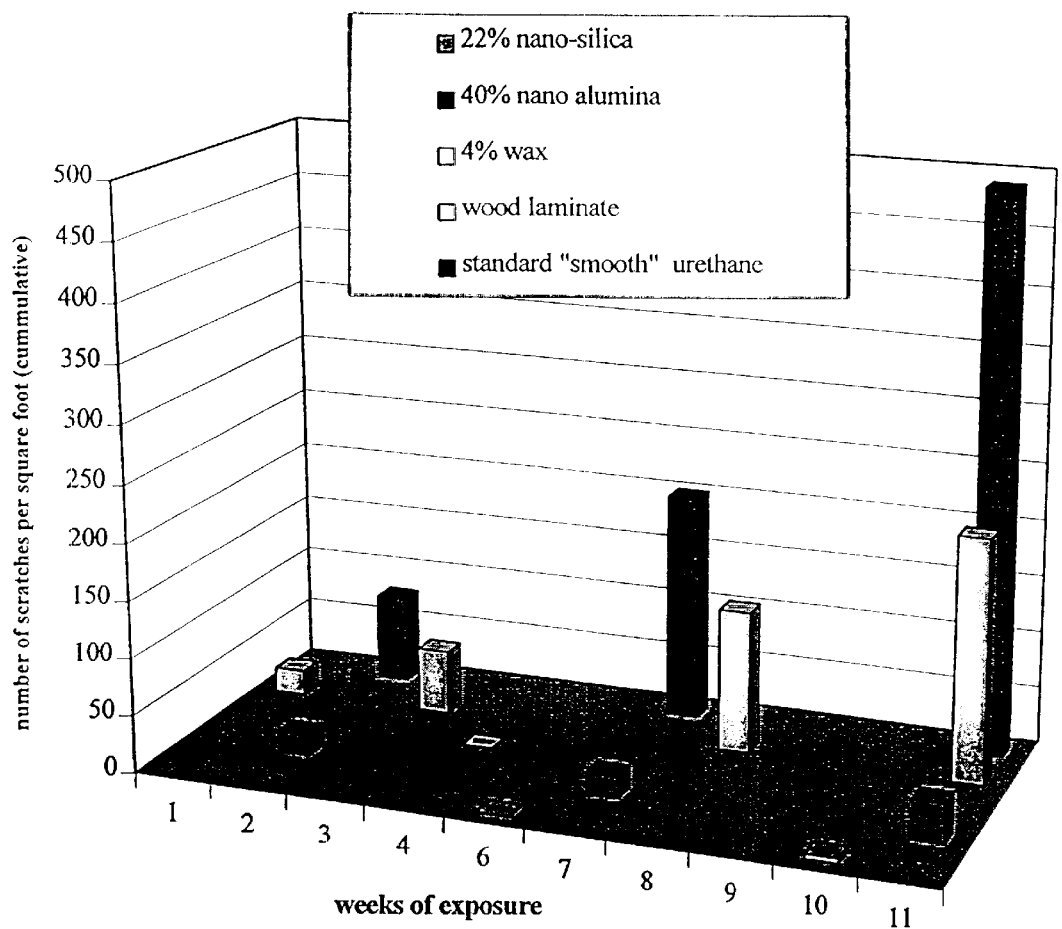
FIG. 33 is a graph of the results of scratch resistance tests for several coatings made according to various embodiments of the present invention.

This example shows the scratch resistance properties of cured coating having macroscopic texture. The pre-cured coating mixtures 4 (40% nano-alumina) and 7 (22% nano-silica) in Example 6 and the coating in Example 12 (4% wax) were coated as described in Example 6 on flexible vinyl sheet flooring and UV cured under inert conditions as described in Example 6. These cured coatings had macroscopic wave-like texture. Pieces measuring 9 in$^2$ were mounted on plywood and placed on the floor in a high traffic area (a cafeteria). After a given amount of time the floor panels were pulled up, cleaned, and evaluated for scratch resistance. The scratch resistance was measured by counting the total number of scratches on a given coating and dividing by the total area in square feet. As controls, a standard high gloss (80–90%) macroscopically smooth urethane containing no inorganics and a wood laminate floor were also evaluated. The results of these tests are shown in FIG. 33. The scratch data clearly show that the textured urethane coatings have fewer scratches per square foot of exposed surface than the standard smooth urethane and the wood laminate.

EXAMPLE 21

This example demonstrates a thermally-cured top coating that provides macroscopic texture. The pre-cured coating composition described in Table 14 was mixed using a Cowles blade mixer at room temperature. This composition is nearly identical to the radiation-curable coating mixture described in Examples 16 and 17 except that a thermally activated initiator (an organic peroxide) was used instead of a UV activated initiator to initiate the curing. This coating mixture was then applied to flexible sheet vinyl at 70° C. using an air knife. The resulting coated substrate (1–1.5 mils thick) was cured at 360° C. for 2 minutes. The resulting solid coating had a ceramic-like macro-texture, which was nearly identical in appearance to those coatings in Example 17.

TABLE 14

Thermally-Curable Coating Composition

| Component | Manufacturer | Coating (Wt %) |
|---|---|---|
| Urethane acrylate (ALUA 1001) | Congoleum | 44.83 |
| Propoxylated diacrylate (SR 306) | Sartomer | 20.53 |
| Ethoxylated trimethylolpropane triacrylate (SR 454) | Sartomer | 11.25 |
| Ethoxylated diacrylate (SR 259) | Sartomer | 6.92 |
| Tertiary-butyl peroxybenzoate (P-20) | Norac | 1.06 |
| 60 μm Nylon 12 (ORGASOL 2002 ES6) | Atochem | 6.25 |
| 5 μm Nylon 12 (ORGASOL 2001 UD) | Atofina | 8 |
| 35 nm Alumina (NANOTEK ALUMINA) | Nanophase | 1 |
| Prehydrolyzed silane (as described in Example 1) | Congoleum | 0.16 |

EXAMPLE 22

This example demonstrates the use of a shrinking wear layer to provide texture from the use of texture-producing particles. A wear layer formulation was made comprising, by weight, 57.8% PVC resin (75HC available from Oxychem, Dallas, Tex.), 6.4% PVC resin (567 available from Oxychem, Dallas, Tex.), 26.6% plasticizer (N-6000 available from Velsicol, Rosemont, Ill.), 2.9% plasticizer (S-375 available from Solutia, St. Louis, Mo.), 1.9% plasticizer (A-150 available from Exxon, Houston, Tex.), and 4.4% stabilizer (2347 available from OMG, Cleveland, Ohio). To this mixture is added 25% solid glass beads (no plasticizer absorption or melting) having a mean diameter of 203 μm (SPHERIGLASS A-1922 available from Potters Industries, Valley Forge, Pa.). The resulting wear layer mixture was coated with a draw bar at 10 mils on a flexible vinyl gel. The resulting sample was then fused at 385° F. for 1.5 minutes. As a control, this same wear layer formulation without the glass beads was coated and gelled. The control plastisol had a visibly smooth surface and a gloss value of 38%. The sample containing glass beads had macroscopic texture and a gloss of 23%, which indicates that the wear layer decreased in thickness during gelation to expose the glass beads.

EXAMPLE 23

To demonstrate wet flocking, a standard PVC plastisol (ULTIMA WEAR LAYER WB4 available from Congoleum Corporation, Mercerville, N.J.) was drawn down on flexible gelled PVC at 10 mils. Several types of particles, as described in Table 15, were each wet flocked on the wet plastisol. These samples were then fused at 385° F. for 1.5 minutes. The visual observations as well as the gloss values for each sample are given in Table 16. The data in Table 16 indicate that wet flocking gives ceramic-like texture as long as the plastisol is fused at a temperature lower than the melting point of the particle. When the fusion temperature is higher than the melting temperature of the particle, the particle melts to form a semi-continuous film on the surface of the plastisol. This phenomenon occurred when Nylon 12 and polypropylene particles were used.

TABLE 15

Particles Used in Wet Flocking

| Type | Tradename | Manuf. | Diameter ($\mu$m) | Melting pt (° F.) |
|---|---|---|---|---|
| Solid glass | SPHERIGLASS A1922 | Potters Industries | 203 | 1300 |
| Nylon 12 | ORGASOL 2002 ES6 | Atofina | 60 | 352 |
| Nylon 66 | | Ashley Polymers | 70 | 513 |
| Nylon 11 | | Ashley Polymers | 100 | 388 |
| polypropylene | PROPYLTEX 100 | Micro-powders | 90 | 330 |
| polypropylene | PROPYLTEX 140 | Micro-powders | 50 | 330 |

TABLE 16

ULTIMA WEAR LAYER Wet Flocked With Various Particles

| Particle | Texture | Gloss (%) | Comments |
|---|---|---|---|
| None | Smooth | 50 | |
| PROPYLTEX 100 | Smooth | 13 | Particles melted |
| PROPYLTEX 140 | Smooth | 12 | Particles melted |
| Nylon 12 | Smooth | 11 | Particles melted |
| Nylon 11 | Ceramic | 3 | |
| Nylon 66 | Ceramic | 3.4 | |
| Glass | Ceramic | 3 | |

EXAMPLE 24

This example illustrates the use of spray coating as a method for applying a radiation-curable coating having macroscopic texture onto a tile substrate. A pre-cured coating mixture having the composition described in Table 17 was applied to a vinyl tile substrate using an air-gun sprayer (Campbell Hausfeld Standard Duty Air-Driven Spray Gun Model DH5300). The spray gun was operated in pressure-feed mode using 45 psig of air pressure, and the nozzle configuration employed was designed for external atomization of the coating droplets by the high-pressure air stream. The tile substrate was sprayed by multiple passes with the handheld spray gun at a height of about 12" from the tile surface until complete coverage of the tile surface by the pre-cured coating mixture was achieved. The sprayed-on, pre-cured coating mixture on the tile substrate was then cured as in Example 2. Both the sprayed-on, pre-cured coating mixture on the tile substrate and the cured coating on the tile substrate exhibited macroscopic texture due to the texture-generating particles present in the pre-cured and cured topcoat.

TABLE 17

UV-Curable Coating Composition

| Component | Wt. % |
|---|---|
| UV-curable Resin from Table 1 | 84.59 |
| ORGASOL 2001 UD (5 micron organic flatting agent) | 8.00 |
| ORGASOL 2002 ES6 (60 micron texture-producing particle) | 6.25 |
| NANOTEK ALUMINA (inorganic RCA) | 1.00 |
| Prehydrolyzed Z-6030 (coupling agent from Example 1) | 0.16 |

EXAMPLE 25

This example shows the use of a roll-coat and air-station combination process (termed a RAS process, as described previously) for application of a radiation-curable, macroscopically textured coating onto a tile substrate. Tile substrates were coated with the pre-cured coating mixture described in Table 18 using a three-roll coater comprised of a hard rubber roll as the upper metering roll (about 90 Shore A Durometer hardness), an engraved steel roll (72 trihelical) as the transfer roll, and a soft rubber roll as the applicator roll. An especially soft durometer (35 Shore A Durometer) for the applicator roll was chosen to promote coating application in deeply embossed grout lines and in other deeply embossed substrate regions. Line speed through the roll-coater was about 70 fpm (feet per minute), and the compression of the applicator roll upon the tile substrate was about 115 mils. The roll-coated tiles exhibited directional lines of texture due to "film-splitting" in the machine direction. Subsequent passage of the roll-coated tiles through an airstation removed this roll-coater directionality. The air-station comprised a vacuum conveyor to hold down the moving tiles, as well as an airknife operating at up to 3.7 psig at angles between +20° and -20° from vertical (vertical referring to the airknife slit pointing down directly upon the tile, and positive angles referring to the slit being angled toward the incoming tile). The airstation line speed was 40 fpm with a knife-to-tile gap of 50 mils, and tiles were passed through with a planar rotation of 45° between the roll-coater directionality lines and the airstation machine direction. Moreover, two passes under the airknife were made, with 90° planar rotation of the tile between passes (i.e., on the second pass there is -45° planar tile rotation between the roll-coater directionality lines and the airstation machine direction). Finally, the pre-cured textured coating was subjected to a low-gloss cure cycle as follows: a) two H-bulb (mercury) lamps on high at 125 fpm in air, then b) six H-bulb (mercury) lamps on high in nitrogen (~3000 ppm residual O2) at 100 fpm. The final, UV-cured coating exhibits a low-gloss, macroscopically textured surface topcoat with textural features characteristic of the 60 micron texture-generating particles present in the coating composition.

TABLE 18

UV-Curable Coating Composition

| Component | Manufacturer | Wt. % |
|---|---|---|
| Ethoxylated trimethylolpropane triacrylate (SR 454) | Sartomer (Exton, PA) | 35.303 |

TABLE 18-continued

UV-Curable Coating Composition

| Component | Manufacturer | Wt. % |
|---|---|---|
| Polyester acrylate (LAROMER PE56F) | BASF (Charlotte, NC) | 41.050 |
| Urethane acrylate (ALUA 1001) | Congoleum (Mercerville, NJ) | 5.747 |
| Acylphosphine oxide (LUCIRIN TPO) | BASF (Charlotte, NC) | 0.330 |
| ACEMATTE OK 412 (3 micron inorganic flatting agent) | Degussa Corp. | 8.000 |
| Prehydrolyzed Z-6030 (coupling agent from Example 1) | See Example 1 | 2.320 |
| NANOTEK ALUMINA (inorganic RCA) | Nanophase Technologies (Burr Ridge, IL) | 1.000 |
| ORGASOL 2002 ES6 (60 micron texture-producing particle) | Atofina (Philadelphia, PA) | 6.250 |

EXAMPLE 26

The application of a radiation-curable coating having macroscopic texture onto a tile already pre-coated with a non-textured radiation-curable coating is demonstrated in this example. Approximately 5 g of a commercial, non-textured UV-curable urethane coating (AMT-475, available from Congoleum Corp., Mercerville, N.J.) was applied to a 12" square tile using a curtain coater. This undercoat was then partially cured in an air environment using four H-bulb (mercury) lamps on high with a line speed of 100 fpm (feet per minute). Next, a second and final topcoat containing macroscopic texture-producing particles and having the composition of Table 17 was applied with a roll-coater and air-station (RAS) process similar to that described in Example 25 (an exception being the use of a two-roll coater instead of the three-roll coater described in Example 25). The double-coated tile was then subjected to the following low gloss cure cycle for curing of the two topcoat layers: a) two H-bulb (mercury) lamps on high at 100 fpm in air, then b) six H-bulb (mercury) lamps on high in nitrogen (~3000 ppm residual O2) at 100 fpm. The partial cure of the non-textured, UV-curable undercoat instills sufficient mechanical strength into the undercoat to withstand the subsequent roll-coating of the textured topcoat. At the same time, the partial undercoat cure also promotes adhesion of the textured topcoat to the undercoat via unreacted acrylate crosslinking units that remain in the undercoat after partial cure and can crosslink with similar reactive groups in the textured topcoat. The final, UV-cured coating exhibits a low-gloss, macroscopically textured surface topcoat adhered to an underlying non-textured, UV-cured basecoat.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A coated flooring substrate, comprising:
    a flooring substrate; and
    a cured resin coating on at least a portion of said flooring substrate, wherein said cured resin coating comprises an exposed top surface having a macroscopic texture, and wherein said cured resin coating had an effective viscosity prior to curing of 100,000–1,000,000 cPs at a shear rate of 0.15 s$^{-1}$ at an application temperature.

2. The coated substrate of claim 1 wherein said coating comprises a radiation-cured resin.

3. The coated substrate of claim 1, wherein said coating further comprises a rheological control agent.

4. The coated substrate of claim 3, wherein said rheological control agent is selected from the group consisting of inorganic particles, organic solids, and mixtures thereof.

5. The coated substrate of claim 1, wherein said coating further comprises:
    a flatting agent comprising 5 micron-sized nylon particles;
    a plurality of texture-producing particles comprising 60 micron-sized nylon particles;
    a rheological control agent comprising a plurality of alumina particles having a particle size distribution in the range of 27–56 nanometers;
    a coupling agent comprising prehydrolized silane; and
    wherein said resin comprises a mixture of urethane acrylate, ethoxylated diacrylate, propoxylated diacrylate, ethoxylated trimethlyolpropane triacrylate, and acylphosphine oxide.

6. The coated substrate of claim 1, wherein said substrate is a polyvinyl chloride substrate, and said cured coating is a radiation-cured coating on at least a portion of said polyvinyl chloride substrate.

7. The coated substrate of claim 6, wherein said polyvinyl chloride substrate comprises polyvinyl chloride plastisol.

8. The coated substrate of claim 7, further comprising:
    a felt layer;
    a gel layer having a gel layer bottom side disposed on said felt layer;
    a print layer disposed on a gel layer top side of said gel layer; and
    wherein a bottom side of said polyvinyl chloride substrate is disposed on said print layer; and said radiation-cured coating is disposed on a top side of said polyvinly chloride substrate.

9. The coated flooring substrate of claim 1, wherein said flooring substrate is a tile.

10. The coated flooring substrate of claim 9, wherein said cured resin coating comprises a mixture of ethoxylated trimethlyolpropane triacrylate, polyester acrylate, urethane acrylate and acylphosphine oxide; said plurality of texture-producing particles comprise nylon particles; and said second plurality of particles comprise alumina particles; and further comprising:
    a flatting agent comprising silica particles; and
    a coupling agent comprising prehydrolized silane.

11. A coated flooring substrate, comprising:
    a flooring substrate having a top substrate surface;
    a cured resin coating covering said top substrate surface, wherein said cured resin coating has a predetermined thickness and a top coating surface that is exposed and has a macroscopic texture;
    a plurality of texture-producing particles within said cured resin coating at a concentration of 1–15% by weight and having an first average particle size, wherein said plurality of texture-producing particles have an average particle diameter that is greater than said predetermined thickness such that said plurality of texture-producing particles provides said macroscopic texture;

and a second plurality of particles within said cured resin coating and having a second average particle size that is different from said first average particle size of said plurality of texture-producing particles.

12. The coated flooring substrate of claim 11, wherein said cured resin coated comprises radiation-cured oligomers and monomers comprising approximately 1–20 radiation-cured groups per molecule.

13. The coated flooring substrate of claim 12, wherein said radiation-cured groups are selected from the group consisting of acrylate, oxirane, vinyl ether, hydroxyl, lactone, and mixtures thereof.

14. The coated flooring substrate of claim 11, wherein said plurality of texture-producing particles have an average particle size of approximately 30–150 microns and is selected from the group consisting of glass, ceramic, alumina, silica, aluminosilicates, alumina coated on silica, polyamide, polypropylene, polyethylene, polytetrafluoroethylene, ethylene copolymers, waxes, epoxy, urea-formaldehyde, nylon, and mixtures thereof.

15. The coated flooring substrate of claim 11, wherein said second plurality of particles is a rheological control agent having an average particle size of approximately 1–100 nanometers and is selected from the group consisting of inorganic particles, organic solids, and mixtures thereof.

16. The coated flooring substrate of claim 11, wherein said cured resin coating comprises a mixture of urethane acrylate, ethoxylated diacrylate, propoxylated diacrylate, ethoxylated trimethlyolpropane triacrylate, and acylphosphine oxide; said plurality of texture-producing particles comprise nylon particles; and said second plurality of particles comprise alumina particles; and further comprising:

a flatting agent comprising nylon particles; and a coupling agent comprising prehydrolized silane.

17. The coating flooring substrate of claim 16, wherein said first average particle size is approximately 60 microns and said second average particle size is approximately 27–56 nanometers.

18. The coated flooring substrate of claim 11, further comprising:

a felt layer;

a gel layer having a gel layer bottom side disposed on said felt layer;

a print layer disposed on a gel layer top side of said gel layer;

a polyvinyl chloride layer disposed on said print layer; and wherein said cured resin coating is disposed on a top side of said polyvinyl chloride layer.

19. The coated flooring substrate of claim 11, wherein said flooring substrate is a tile.

20. The coated flooring substrate of claim 19, wherein said cured resin coating comprises a mixture of ethoxylated trimethlyolpropane triacrylate, polyester acrylate, urethane acrylate and acylphosphine oxide; said plurality of texture-producing particles comprise nylon particles; and said second plurality of particles comprise alumina particles; and further comprising:

a flatting agent comprising silica particles; and a coupling agent comprising prehydrolized silane.

21. A coated flooring substrate, comprising:

a flooring substrate having a top substrate surface;

a cured resin coating covering said top substrate surface, wherein said cured resin coating has a predetermined thickness and a top exposed coating surface that has a macroscopic texture;

a plurality of texture-producing particles within said cured resin coating at a concentration of 1–15% by weight, wherein said plurality of texture-producing particles have an average particle size of approximately 30–150 microns;

and a second plurality of particles within said cured resin coating having an average particle size of approximately 1–100 nanometers.

22. The coated flooring substrate of claim 21, wherein said cured resin coated comprises radiation-cured oligomers and monomers comprising approximately 1–20 radiation-cured groups per molecule.

23. The coated flooring substrate of claim 22, wherein said radiation-cured groups are selected from the group consisting of acrylate, oxirane, vinyl ether, hydroxyl, lactone, and mixtures thereof.

24. The coated flooring substrate of claim 21, wherein said plurality of texture-producing particles is selected from the group consisting of glass, ceramic, alumina, silica, aluminosilicates, alumina coated on silica, polyamide, polypropylene, polyethylene, polytetrafluoroethylene, ethylene copolymers, waxes, epoxy, urea-formaldehyde, nylon, and mixtures thereof.

25. The coated flooring substrate of claim 21, wherein said second plurality of particles is a rheological control agent selected from the group consisting of inorganic particles, organic solids, and mixtures thereof.

26. The coated flooring substrate of claim 23, wherein said cured resin coating comprises a mixture of urethane acrylate, ethoxylated diacrylate, propoxylated diacrylate, ethoxylated trimethlyolpropane triacrylate, and acylphosphine oxide; said plurality of texture-producing particles comprise nylon particles; and said second plurality of particles comprise alumina particles; and further comprising:

a flatting agent comprising nylon particles; and a coupling agent comprising prehydrolized silane.

27. The coating substrate of claim 26, wherein said first average particle size is approximately 60 microns and said second average particle size is approximately 27–56 nanometers.

28. The coated substrate of claim 21, further comprising:

a felt layer;

a gel layer having a gel layer bottom side disposed on said felt layer;

a print layer disposed on a gel layer top side of said gel layer;

a polyvinyl chloride layer disposed on said print layer; and wherein said cured resin coating is disposed on a top side of said polyvinyl chloride layer.

29. The coated flooring substrate of claim 21, wherein said flooring substrate is a tile.

30. The coated flooring substrate of claim 29, wherein said cured resin coating comprises a mixture of ethoxylated trimethlyolpropane triacrylate, polyester acrylate, urethane acrylate and acylphosphine oxide; said plurality of texture-producing particles comprise nylon particles; and said sec ond plurality of particles comprise alumina particles; and further comprising:

a flatting agent comprising silica particles; and a coupling agent comprising prehydrolized silane.

31. A process for making a coating on a flooring substrate, comprising the steps of:

distributing a pre-cured coating mixture comprising a curable resin, an initiator, 1–15% by weight of a plurality of texture-producing particles having a first average particle size and an average diameter, and a second plurality of particles having a second average particle size less than said first average particles size over at least a portion of a flooring substrate to form a pre-cured coating having a thickness less than said average diameter of said plurality of texture-producing particles, thereby providing a macroscopic texture to an exposed surface of said pre-cured coating; and curing said pre-cured coating to form a cured coating having said macroscopic texture.

32. The process of claim 31, further comprising:

mixing said curable resin, said initiator, said plurality of texture-producing particles and said second plurality of particles prior to said distributing.

33. The process of claim 32, wherein said mixing is performed at a temperature of approximately 70° C. or less.

34. The process of claim 32, wherein said distributing is performed using an air knife or a roll coater.

35. The process of claim 34, wherein said flooring substrate comprises a tile and said distributing is performed using a roll coater, thereby producing said macroscopic texture having a directionality imparted from said roll-coater and further comprising redistributing said macroscopic texture to reduce said directionality.

36. The process of claim 35, wherein said redistributing is performed using an air knife.

37. The process of claim 35, further comprising rotating said tile after said distributing step and prior to said redistributing step.

38. The process of claim 31, wherein said flooring substrate is a sheet flooring substrate or a tile substrate.

39. A process for making a coating on a flooring substrate, comprising the steps of:

distributing a pre-cured coating mixture comprising a radiation or thermally curable resin and an initiator and having an effective viscosity prior to curing of 100,000–1,000,000 cPs at a shear rate of $0.15 \text{ s}^{-1}$ at an application temperature over at least a portion of a flooring substrate to form a pre-cured coating having a macroscopic texture; and curing said pre-cured coating to form a cured coating having an exposed surface having said macroscopic texture.

40. The process of claim 39, further comprising:

mixing said curable resin, said initiator, said plurality of texture-producing particles and said second plurality of particles prior to said distributing.

41. The process of claim 40, wherein said mixing is performed at a temperature of approximately 70° C. or less.

42. The process of claim 40, wherein said distributing is performed using an air knife or a roll coater.

43. The process of claim 40, wherein said distributing produces a pre-cured coating on said flooring substrate having a thickness that is less than an average diameter of said texture-producing particles.

44. The process of claim 39, wherein said flooring substrate is a sheet flooring substrate or a tile substrate.

45. A coated flooring substrate, comprising:

a flooring substrate having a top substrate surface;

a cured resin coating covering said top substrate surface, wherein said cured resin coating has a predetermined thickness and a top coating surface that is exposed and has a macroscopic texture;

a plurality of texture-producing particles within said cured resin coating and having an first average particle size greater than said predetermined thickness such that said plurality of texture-producing particles provides said macroscopic texture; and a second plurality of particles comprising inorganic particles selected from the group consisting of aluminosilicates, alumina coated on silica, calcium carbonate and clay within said cured resin coating and having a second average particle size that is smaller than said first average particle size of said plurality of texture-producing particles.

46. The coating flooring substrate of claim 45, wherein said cured resin coated comprises radiation-cured oligomers and monomerss comprising approximately 1–20 radiation-curable groups per molecule.

47. The coated flooring substrate of claim 46, wherein said radiation-curable groups are selected from the group consisting of acrylate, oxirane, vinyl ether, hydroxyl, lactone, and mixtures thereof.

48. The coated flooring substrate of claim 45, wherein said plurality of texture-producing particles has an average particle size of approximately 30–150 microns and is selected from the group consisting of glass, ceramic, alumina, silica, aluminosilicates, alumina coated on silica, polyamide, polypropylene, polyethylene, polytetrafluoroethylene, ethylene copolymers, waxes, epoxy, urea-formaldehyde, nylon, and mixtures thereof.

49. The coated flooring substrate of claim 45, wherein said second plurality of particles is a rheological control agent having an average particle size of approximately 1–100 nanometers and is selected from the group consisting of inorganic particles, organic solids, and mixtures thereof.

50. The coated flooring substrate of claim 45, wherein said cured resin coating comprises a cured resin cured from a mixture comprising urethane acrylate, ethoxylated diacrylate, propoxylated diacrylate, ethoxylated trimethlyolpropane triacrylate, and acylphosphine oxide; said plurality of texture-producing particles comprise nylon particles; and said second plurality of particles comprise alumina particles; and further comprising:

a flatting agent comprising nylon particles; and a coupling agent comprising prehydrolized silane.

51. The coating substrate of claim 50, wherein said first average particle size is approximately 60 microns and said second average particle size is approximately 27–56 nanometers.

52. The coated substrate of claim 45, further comprising:

a felt layer;

a gel layer having a gel layer bottom side disposed on said felt layer;

a print layer disposed on a gel layer top side of said gel layer;

a polyvinyl chloride layer disposed on said print layer; and wherein said cured resin coating is disposed on a top side of said polyvinyl chloride layer.

53. The coated flooring substrate of claim 45, wherein said flooring substrate is a tile.

54. The coated flooring substrate of claim 53, wherein said cured resin coating comprises a cured resin cured from a mixture comprising ethoxylated trimethlyolpropane triacrylate, polyester acrylate, urethane acrylate and acylphosphine oxide; said plurality of texture-producing particles comprise nylon particles; and said second plurality of particles comprise alumina particles; and further comprising:

a flatting agent comprising silica particles; and a coupling agent comprising prehydrolized silane.

* * * * *